(12) United States Patent
Ito et al.

(10) Patent No.: US 9,633,305 B2
(45) Date of Patent: Apr. 25, 2017

(54) ANTENNA DEVICE AND WIRELESS COMMUNICATION TERMINAL

(71) Applicant: Murata Manufacturing Co., Ltd., Nagaokakyo-shi, Kyoto-fu (JP)

(72) Inventors: Hiromitsu Ito, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 149 days.

(21) Appl. No.: 14/803,227

(22) Filed: Jul. 20, 2015

(65) Prior Publication Data

US 2015/0325917 A1    Nov. 12, 2015

Related U.S. Application Data

(63) Continuation of application No. PCT/JP2014/082806, filed on Dec. 11, 2014.

(30) Foreign Application Priority Data

Mar. 17, 2014  (JP) ................................. 2014-053220
Apr. 30, 2014  (WO) .................. PCT/JP2014/061963

(51) Int. Cl.
*H01Q 7/00* (2006.01)
*H01Q 1/24* (2006.01)
(Continued)

(52) U.S. Cl.
CPC ......... *G06K 19/07783* (2013.01); *H01Q 1/24* (2013.01); *H01Q 1/243* (2013.01); *H01Q 1/50* (2013.01); *H01Q 7/00* (2013.01)

(58) Field of Classification Search
CPC .................... G06K 19/07783; G06K 19/07788
See application file for complete search history.

(56) References Cited

U.S. PATENT DOCUMENTS

2004/0177492 A1   9/2004  Eckstein et al.
2007/0090955 A1   4/2007  Cote et al.
(Continued)

FOREIGN PATENT DOCUMENTS

JP   2001-156526 A   6/2001
JP   2001-175827 A   6/2001
(Continued)

OTHER PUBLICATIONS

Official Communication issued in International Patent Application No. PCT/JP2014/082806, mailed on Mar. 3, 2015.

*Primary Examiner* — Hoang V Nguyen
*Assistant Examiner* — Michael Bouizza
(74) *Attorney, Agent, or Firm* — Keating & Bennett, LLP

(57) ABSTRACT

An antenna device includes an antenna coil member and an extension member. The antenna coil member includes a first base, and a spiral conductor is on a front surface of the first base. An inner-peripheral-end conductor is connected to an inner peripheral end of the spiral conductor, and an outer-peripheral-end conductor is connected to an outer peripheral end. The extension member includes a second base, and first and second extension conductor patterns are located on a front surface of the second base. First and second end-portion conductors are respectively connected to ends of the first and second extension conductor patterns. The extension member is arranged at a front surface side of the antenna coil member, the inner-peripheral-end conductor faces the first end-portion conductor, and the outer-peripheral-end conductor faces the second end-portion conductor.

20 Claims, 33 Drawing Sheets

(51) Int. Cl.
    *H01Q 1/50*     (2006.01)
    *G06K 19/077*     (2006.01)

(56) References Cited

U.S. PATENT DOCUMENTS

2009/0065588 A1\*   3/2009   Aoki ................ H01Q 7/00
                                          235/492
2009/0145971 A1\*   6/2009   Yin ................ G06K 19/07783
                                            235/492

FOREIGN PATENT DOCUMENTS

| | | |
|---|---|---|
| JP | 2002-325013 A | 11/2002 |
| JP | 2003-141478 A | 5/2003 |
| JP | 2004-213582 A | 7/2004 |
| JP | 2005-045161 A | 2/2005 |
| JP | 2006-521632 A | 9/2006 |
| JP | 2006-270671 A | 10/2006 |
| JP | 2009-516941 A | 4/2009 |
| JP | 2012-010410 A | 1/2012 |

\* cited by examiner

ANTENNA DEVICE AND WIRELESS COMMUNICATION TERMINAL

BACKGROUND OF THE INVENTION

1. Field of the Invention

The present invention relates to an antenna device that transmits and receives a high-frequency signal, and a wireless communication terminal.

2. Description of the Related Art

As described in Japanese Unexamined Patent Application Publication No. 2002-325013 and Japanese Unexamined Patent Application Publication No. 2001-156526, there are practically used antenna devices of related art each including an antenna coil configured of a spiral-shaped conductor pattern formed on a front surface of a substrate.

When such an antenna device is connected to an external circuit, in many cases, the antenna device is arranged with closely located terminals that are connected to an inner peripheral end and an outer peripheral end of the antenna coil. Hence, a routing configuration from the inner peripheral end of the antenna coil (an inner peripheral end of the spiral-shaped conductor pattern) to a region outside the spiral shape and a routing configuration from the outer peripheral end of the antenna coil (an outer peripheral end of the spiral-shaped conductor pattern) to a region inside the spiral shape are required.

Referring to Japanese Unexamined Patent Application Publication No. 2002-325013, a spiral-shaped conductor pattern is formed on a first surface of a substrate. A routing conductor is formed on a second surface (a surface opposite to the first surface) of the substrate. An inner peripheral end of the spiral-shaped conductor pattern is connected to the routing conductor by a through-hole conductor penetrating through the substrate. The inner peripheral end of the spiral-shaped conductor pattern is connected to an external circuit pattern having a spiral-shaped conductor pattern through the through-hole conductor and the routing conductor.

Referring to Japanese Unexamined Patent Application Publication No. 2001-156526, a spiral-shaped conductor pattern is formed on a first surface of a substrate, and a routing conductor (a bridge conductor) is formed on the spiral-shaped conductor pattern. In a region where the routing conductor (the bridge conductor) and the spiral-shaped conductor pattern overlap each other, an insulating layer is arranged between the routing conductor and the spiral-shaped conductor pattern. For example, such an insulating layer is formed by applying an insulating paste. The routing conductor is formed by applying a conductive paste on the insulating later.

With the configuration described in Japanese Unexamined Patent Application Publication No. 2002-325013, since the through-hole conductor has to be formed in the substrate, the load of the process may be increased. Also, since the through-hole conductor is formed by plating the through hole, and the spiral-shaped conductor pattern and the routing conductor are formed by patterning the surfaces of the substrate, connection reliability between the through-hole conductor and the spiral-shaped conductor pattern and connection reliability between the through-hole conductor and the routing conductor may not be in good condition. In addition, since the substrate having the conductors formed on both sides has to be used, the degree of selectivity of the substrate may be decreased.

With the configuration described in Japanese Unexamined Patent Application Publication No. 2001-156526, since the routing conductor is formed with the conductive paste, for example, if a silver paste is used, electrochemical migration of the silver may occur and the possibility of occurrence of a short circuit may be increased. Also, since the routing conductor is formed with the conductive paste, the possibility of breakage of the routing conductor may be increased due to a curve or a bend. That is, with the configuration described in Japanese Unexamined Patent Application Publication No. 2001-156526, reliability of the routing conductor may be decreased.

SUMMARY OF THE INVENTION

Preferred embodiments of the present invention provide an antenna device with a simple configuration and high reliability.

An antenna device according to a preferred embodiment of the present invention includes an antenna coil member and an extension member. The antenna coil member includes an insulating first base, an antenna coil including a spiral-shaped conductor pattern on a front surface of the first base, an inner-peripheral-end conductor on the front surface of the first base and connected to an inner peripheral end of the spiral-shaped conductor pattern, and an outer-peripheral-end conductor on the front surface of the first base and connected to an outer peripheral end of the spiral-shaped conductor pattern. The extension member includes an insulating second base, first and second extension conductor patterns on a front surface of the second base, a first end-portion conductor on the front surface of the second base and connected to one end of the first extension conductor pattern, and a second end-portion conductor on the front surface of the second base and connected to one end of the second extension conductor pattern.

The antenna coil member and the extension member preferably include one or more of the following configurations. The inner-peripheral-end conductor faces the first end-portion conductor, and the outer-peripheral-end conductor faces the second end-portion conductor. The other end of the first extension conductor pattern or the other end of the second extension conductor pattern does not overlap the spiral-shaped conductor pattern. The other ends of the first and second extension conductor patterns are arranged inside or outside the spiral-shaped conductor pattern.

With this configuration, since the inner-peripheral-end conductor faces the first end-portion conductor, the inner-peripheral-end conductor and the first end-portion conductor include capacitive coupling. Accordingly, the spiral-shaped conductor pattern configuring the antenna coil is connected to the first extension conductor pattern in terms of high frequency. Connection in terms of high frequency represents a state in which a high-frequency signal is able to be transmitted. With this configuration, the inner peripheral end of the antenna coil is easily extended to the outside of the antenna coil without provision of a conductive via conductor or a bridge conductor.

Also, in an antenna device according to a preferred embodiment of the present invention, a width of the inner-peripheral-end conductor and a width of the outer-peripheral-end conductor are preferably larger than a width of the spiral-shaped conductor pattern.

With this configuration, the capacitive coupling between the inner-peripheral-end conductor and the first end-portion conductor and the capacitive coupling between the outer-peripheral-end conductor and the second end-portion conductor are further reliably realized.

Also, in an antenna device according to a preferred embodiment of the present invention, a facing area between the inner-peripheral-end conductor and the first end-portion conductor is preferably equivalent or substantially equivalent to a facing area between the outer-peripheral-end conductor and the second end-portion conductor.

With this configuration, further stable balanced output from the antenna coil is realized.

Also, an antenna device according to a preferred embodiment of the present invention preferably has the following configuration. An area of the inner-peripheral-end conductor differs from an area of the first end-portion conductor in a plan view, and an area of the outer-peripheral-end conductor differs from an area of the second end-portion conductor in a plan view.

With this configuration, a change in the degree of capacitive coupling (change in capacitance) due to a positional deviation of arrangement of the extension member with respect to the antenna coil member is significantly reduced or prevented.

Also, an antenna device according to a preferred embodiment of the present invention preferably has the following configurations. The first end-portion conductor, the second end-portion conductor, the inner-peripheral-end conductor, and the outer-peripheral-end conductor preferably are rectangular or substantially rectangular in a plan view. Long sides of the first end-portion conductor, the second end-portion conductor, the inner-peripheral-end conductor, and the outer-peripheral-end conductor are parallel or substantially parallel to each other.

With this configuration, a change in the degree of capacitive coupling (change in capacitance) due to a positional deviation of arrangement of the extension member with respect to the antenna coil member is further effectively significantly reduced or prevented.

Also, an antenna device according to a preferred embodiment of the present invention includes a protection layer that covers at least one of principal surfaces of the first end-portion conductor and the second end-portion conductor located opposite to the second base, and principal surfaces of the inner-peripheral-end conductor and the outer-peripheral-end conductor located opposite to the first base.

With this configuration, the conductors are protected from the external environment, and stable characteristics of the antenna device are obtained.

Also, in an antenna device according to a preferred embodiment of the present invention, a planar area of the second base is preferably smaller than a planar area of the first base.

With this configuration, if an external-connection land conductor is provided at the other ends of the first and second extension conductor patterns of the extension member and the external-connection land conductor is plated (for example, Au plating), the area of a member required to be plated is decreased.

Also, in an antenna device according to a preferred embodiment of the present invention, preferably, the antenna coil member is not plated and the extension member is plated. With this configuration, only a portion required to be plated for connection with an external circuit is able to be plated, and the antenna device preferably is formed with plating of minimum requirement.

Also, in an antenna device according to a preferred embodiment of the present invention, the first base and the second base are preferably made of different materials. With this configuration, the first base may use a base corresponding to material characteristics requested in accordance with radiation characteristics of the antenna, and the second base may use a base corresponding to material characteristics requested in accordance with reliability for external connection.

Also, a wireless communication terminal according to a preferred embodiment of the present invention includes any of the above-described antenna devices; a transmission/reception IC connected to the antenna coil; and a matching circuit connected between the antenna coil and the transmission/reception IC. A capacitor provided because the inner-peripheral-end conductor faces the first end-portion conductor and a capacitor provided because the outer-peripheral-end conductor faces the second end-portion conductor configure at least a portion of the matching circuit.

With this configuration, since a portion of the matching circuit is realized by the configuration of the antenna device, a portion of the matching circuit configured of a portion other than the configuration of the antenna device is simplified. Accordingly, the wireless communication terminal is able to be downsized.

Also, with a wireless communication terminal according to a preferred embodiment of the present invention, the first base may be a housing of the terminal. Alternatively, a wireless communication terminal according to a preferred embodiment of the present invention includes any of the above-described antenna devices; a transmission/reception IC connected to the antenna coil; and a matching circuit connected between the antenna coil and the transmission/reception IC. The second base may be a housing of the terminal.

With these configurations, the constituent elements configuring the wireless communication terminal are reduced, and the wireless communication terminal is downsized or thinned.

An antenna device with high reliability is realized with a simple configuration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
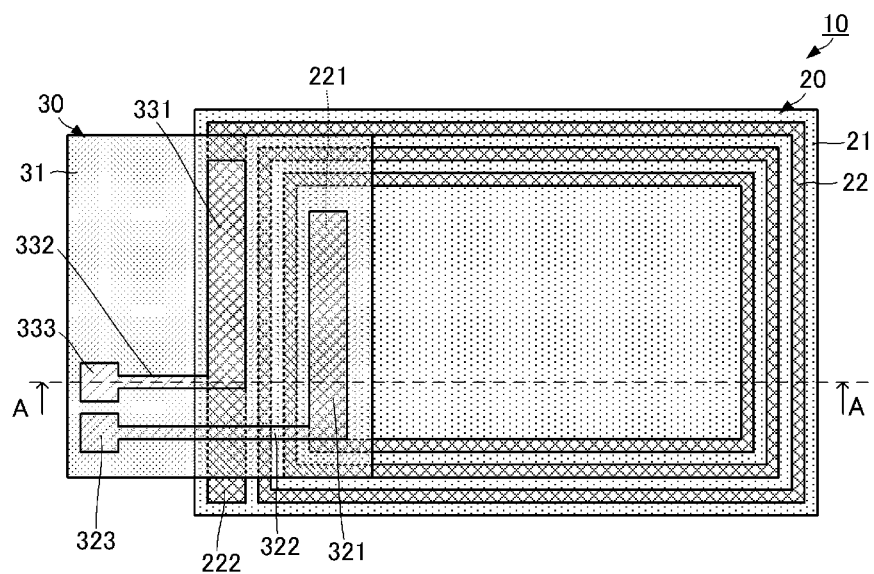
FIGS. 1A and 1B are a plan view and a side cross-sectional view of an antenna device according to a first preferred embodiment of the present invention.
Figure 1B:
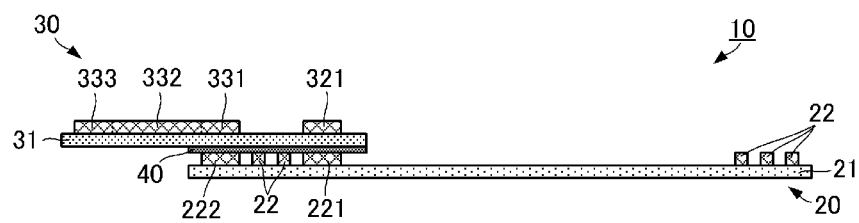
Figure 2A:
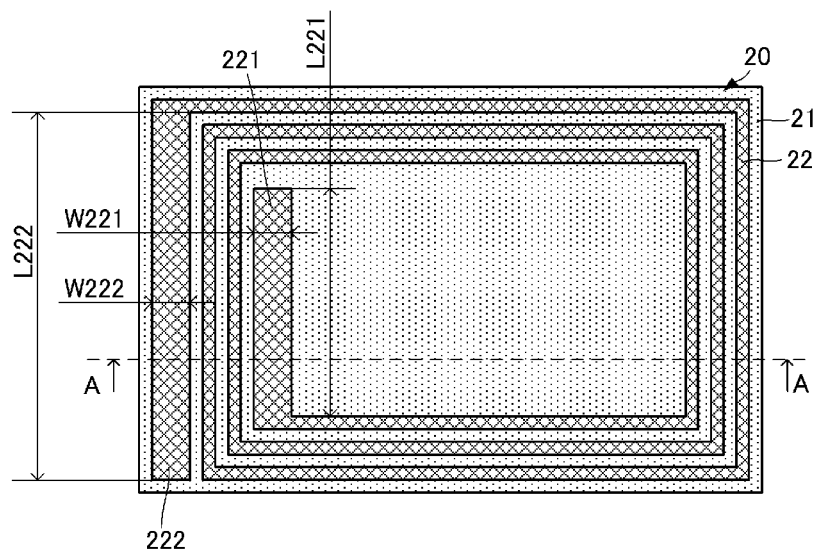
FIGS. 2A and 2B are a plan view and a side cross-sectional view of an antenna coil member according to the first preferred embodiment of the present invention.
Figure 2B:
Figure 3A:
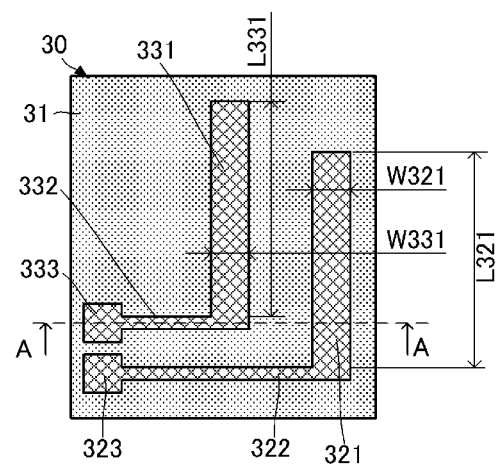
FIGS. 3A and 3B are a plan view and a side cross-sectional view of an extension member according to the first preferred embodiment of the present invention.
Figure 3B:
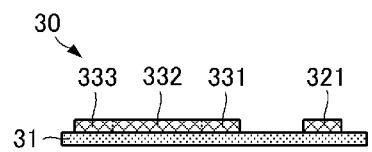

An antenna device and a wireless communication terminal according to a first preferred embodiment of the present invention are described with reference to the drawings. FIGS. 1A and 1B are a plan view and a side cross-sectional view of the antenna device according to the first preferred embodiment of the present invention. FIGS. 2A and 2B are a plan view and a side cross-sectional view of an antenna coil member according to the first preferred embodiment of the present invention. FIGS. 3A and 3B are a plan view and a side cross-sectional view of an extension member according to the first preferred embodiment of the present invention. Each of FIGS. 1A, 2A, and 3A is a plan view and each of FIGS. 1B, 2B and 3B is a side cross-sectional view (A-A cross-sectional view).

As shown in FIGS. 1A and 1B, an antenna device 10 includes an antenna coil member 20 and an extension member 30.

As shown in FIGS. 2A and 2B, the antenna coil member 20 includes a first base 21. The first base 21 preferably is a quadrangular or substantially quadrangular flat plate in a plan view. The first base 21 is preferably made of an insulating resin material, for example, PET (Polyethylene terephthalate).

The antenna coil member 20 includes a spiral conductor 22. The spiral conductor 22 is a spiral-shaped conductor pattern in a plan view. The spiral conductor 22 is arranged on a front surface of the first base 21 (one of principal surfaces of the flat plate). The formation region of the spiral conductor 22 extends along an entire or substantially an entire region of the front surface of the first base 21.

An inner peripheral end of the spiral conductor 22 is connected to an inner-peripheral-end conductor 221. The inner-peripheral-end conductor 221 continuously extends in the spiral shape from the inner peripheral end in an extending direction of the spiral conductor 22.

An outer peripheral end of the spiral conductor is connected to an outer-peripheral-end conductor 222. The outer-peripheral-end conductor 222 continuously extends in the spiral shape from the outer peripheral end in the extending direction of the spiral conductor 22.

A width W221 of the inner-peripheral-end conductor 221 and a width W222 of the outer-peripheral-end conductor 222 are larger than the width of the spiral conductor 22. The inner-peripheral-end conductor 221 and the outer-peripheral-end conductor 222 are quadrangular in a plan view. The long sides of the inner-peripheral-end conductor 221 are parallel or substantially parallel to the long sides of the outer-peripheral-end conductor 222. The long sides of the inner-peripheral-end conductor 221 and the outer-peripheral-end conductor 222 are parallel or substantially parallel to the short sides of the first base 21.

The spiral conductor 22, the inner-peripheral-end conductor 221, and the outer-peripheral-end conductor 222 are formed of, for example, aluminum Al.

The antenna coil member 20 having such a configuration can be manufactured, for example, by preparing PET having aluminum formed in the entire region of one surface (a front surface) and patterning the aluminum.

As shown in FIGS. 3A and 3B, the extension member 30 includes a second base 31. The second base 31 preferably is a quadrangular or substantially quadrangular flat plate in a plan view. The second base 31 is made of an insulating resin material, for example, polyimide, liquid crystal polymer, or PET like the first base 21. In polyimide is used for the material of the second base 31, the second base 31 has higher resistance to heat as compared with PET. Hence, in a configuration in which a mount-type electronic component is mounted on the second base 31 by soldering or a configuration in which an external-connection land conductor is joined to an external substrate by soldering, deformation with heat of the second base 31 is significantly reduced or prevented and reliability is improved. In other words, reliability of the antenna device 10 is improved without use of a heat-resistant material for the antenna coil member 20.

The extension member 30 includes a first end-portion conductor 321, a first extension conductor pattern 322, a second end-portion conductor 331, a second extension conductor pattern 332, and external-connection land conductors 323 and 333. The first end-portion conductor 321, the first extension conductor pattern 322, the second end-portion conductor 331, the second extension conductor pattern 332, and the external-connection land conductors 323 and 333 are arranged on a front surface of the second base 31 (one of principal surfaces of the flat plate).

The first extension conductor pattern 322 and the second extension conductor pattern 332 preferably are straight line-shaped conductors. For example, in this preferred embodiment, extending directions of the first extension conductor pattern 322 and the second extension conductor pattern 332 are parallel or substantially parallel to a side of the second base 31.

The first end-portion conductor 321 is connected to one end in the extending direction of the first extension conductor pattern 322. The first end-portion conductor 321 preferably is rectangular or substantially rectangular in a plan view. A width W321 of the first end-portion conductor 321 is larger than the width of the first extension conductor pattern 322. The longitudinal direction of the first end-portion conductor 321 is perpendicular or substantially perpendicular to the extending direction of the first extension conductor pattern 322. The area of the first end-portion conductor 321 is the same or substantially the same as the area of the inner-peripheral-end conductor 221.

The second end-portion conductor 331 is connected to one end in the extending direction of the second extension conductor pattern 332. The second end-portion conductor 331 preferably is rectangular or substantially rectangular in a plan view. A width W331 of the second end-portion conductor 331 is larger than the width of the second extension conductor pattern 332. The longitudinal direction of the second end-portion conductor 331 is perpendicular or substantially perpendicular to the extending direction of the second extension conductor pattern 332. The area of the second end-portion conductor 331 is the same or substantially the same as the area of the outer-peripheral-end conductor 222.

The external-connection land conductor 323 is connected to the other end in the extending direction of the first extension conductor pattern 322. The external-connection land conductor 323 preferably has a quadrangular or substantially quadrangular shape being substantially square in a plan view. The length of a side of the external-connection land conductor 323 is larger than the width of the first extension conductor pattern 322.

The external-connection land conductor 333 is connected to the other end in the extending direction of the second extension conductor pattern 332. The external-connection land conductor 333 preferably has a quadrangular or substantially quadrangular shape being square or substantially square in a plan view. The length of a side of the external-connection land conductor 333 is larger than the width of the second extension conductor pattern 332.

The first end-portion conductor 321, the first extension conductor pattern 322, the second end-portion conductor 331, the second extension conductor pattern 332, and the external-connection land conductors 323 and 333 are formed of, for example, copper Cu. Their front surfaces preferably are plated with nickel and gold (Ni plating and Au plating). The first end-portion conductor 321, the first extension conductor pattern 322, and the external-connection land conductor 323 preferably are integrally formed. The second end-portion conductor 331, the second extension conductor pattern 332, and the external-connection land conductor 333 preferably are integrally formed.

The extension member 30 having such a configuration preferably is manufactured, for example, by preparing polyimide having copper Cu formed in the entire region of one surface (a front surface) and patterning the copper.

As shown in FIGS. 1A and 1B, the extension member 30 is arranged at the front surface side of the antenna coil member 20. At this time, the extension member 30 and the antenna coil member 20 are arranged so that the first end-portion conductor 321 overlaps the inner-peripheral-end conductor 221 in a plan view and the second end-portion conductor 331 overlaps the outer-peripheral-end conductor 222 in a plan view. Further, the extension member 30 and the antenna coil member 20 are arranged so that the other ends of the first and second extension conductor patterns 322 and 332 of the extension member 30, i.e., the external-connection land conductor 323 or 333 does not overlap the antenna coil member 20.

The extension member 30 and the antenna coil member 20 are bonded by an insulating adhesive layer 40. The adhesive layer 40 is arranged in a region where the extension member 30 overlaps the antenna coil member 20.

With such a configuration, the first end-portion conductor 321 and the inner-peripheral-end conductor 221 are coupled by capacitive coupling (i.e., define a capacitor) through the second base 31 and the adhesive layer 40. Hence, the spiral conductor 22 and the first extension conductor pattern 322 are connected in terms of high frequency. In this case, connection in terms of high frequency represents a state in which a high-frequency signal is transmitted between the spiral conductor 22 and the first extension conductor pattern 322.

The second end-portion conductor 331 and the outer-peripheral-end conductor 222 are coupled by capacitive coupling (define a capacitor) through the second base 31 and the adhesive layer 40. Hence, the spiral conductor 22 and the second extension conductor pattern 332 are connected in terms of high frequency. In this case, connection in terms of high frequency represents a state in which a high-frequency signal is transmitted between the spiral conductor 22 and the second extension conductor pattern 332.

As described above, by using the configuration of this preferred embodiment, a high-frequency signal is extracted from the inner peripheral end of the spiral conductor 22 without provision of a conductive via conductor or a bridge conductor. Accordingly, an antenna device with high reliability is realized with a simple configuration.

Described above is the configuration in which the widths of the inner-peripheral-end conductor 221 and the outer-peripheral-end conductor 222 are larger than the width of the spiral conductor 22. However, the widths of the inner-peripheral-end conductor 221 and the outer-peripheral-end conductor 222 may be the same or substantially the same as the width of the spiral conductor 22. If the widths of the inner-peripheral-end conductor 221 and the outer-peripheral-end conductor 222 are larger than the width of the spiral conductor 22, capacitive coupling with higher reliability is realized.

Also, described above is the configuration in which the area of the first end-portion conductor 321 is the same or substantially the same as the area of the inner-peripheral-end conductor 221. However, a configuration in which one of the first end-portion conductor 321 and the inner-peripheral-end conductor 221 has a larger area may be used. In this case, the area of the inner-peripheral-end conductor 221 may be preferably larger. As long as the areas are different, a change in capacitance due to a positional deviation of arrangement of the extension member 30J with respect to the antenna coil member 20J is significantly reduced or prevented. Further, if the area of the inner-peripheral-end conductor 221 and the area of the outer-peripheral-end conductor 222 are larger, the areas of the first and second end-portion conductors 321 and 331 do not have to be larger. The first and second end-portion conductors 321 and 331 are prevented from overlapping the spiral conductor 22. Accordingly, deterioration in characteristics of the antenna coil is significantly reduced or prevented.

Also, the facing area between the first end-portion conductor 321 and the inner-peripheral-end conductor 221 may be preferably the same or substantially the same as the facing area between the second end-portion conductor 331 and the outer-peripheral-end conductor 222. With such a configuration, a balanced signal including a high-frequency signal extracted from the outer-peripheral-end conductor 222 and a high-frequency signal extracted from the inner-peripheral-end conductor 221 has good amplitude characteristics and phase characteristics.

Also, as described above, since the antenna coil member 20 and the extension member 30 are separate members and the area of the extension member 30 is smaller than the area of the antenna coil member 20K, the separate members and the smaller area are effective when the external-connection land conductors 323 and 333 are plated. That is, since the antenna coil member 20 is not required to be plated and the area of the extension member 30 (the area in which plating processing is executed) is small, the cost of plating is decreased.

Described above is the configuration in which the first base 21 and the second base 31 preferably are quadrangular or substantially quadrangular. However, the external shapes are not limited thereto. Also, the angle at which the first end-portion conductor 321 is connected to the first extension conductor pattern 322 and the angle at which the second end-portion conductor 331 is connected to the second extension conductor pattern 332 do not have to be a right angle or substantially a right angle. However, if these connection angles are right angles or substantially right angles, electromagnetic field coupling between the antenna coil and the first and second extension conductor patterns 322 and 332 is significantly reduced or prevented.

Figure 4:
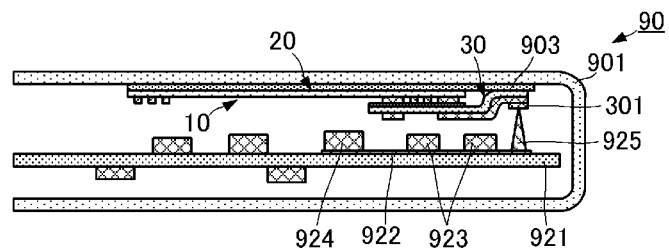
FIG. 4 is a partial side view of a wireless communication terminal according to the first preferred embodiment of the present invention.
Figure 5:
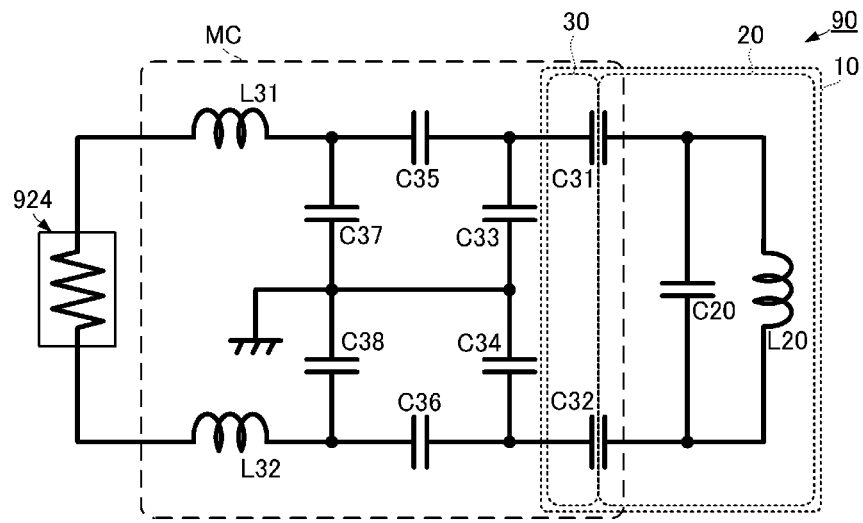
FIG. 5 is a circuit diagram of the wireless communication terminal according to the first preferred embodiment of the present invention.

Such an antenna device 10 is mounted on a wireless communication terminal described below. FIG. 4 is a partial side view of the wireless communication terminal according to the first preferred embodiment of the present invention. FIG. 5 is a circuit diagram of the wireless communication terminal according to the first preferred embodiment of the present invention.

As shown in FIG. 4, a wireless communication terminal includes the antenna device 10, a housing 901, and a transmission/reception circuit base 921.

The antenna device 10 is bonded to an inner wall surface of the housing 901 through an adhesive layer 903. At this time, the antenna device 10 is arranged so that the back surface of the antenna coil member 20 contacts the adhesive layer 903.

A wiring conductor 922 is arranged on the transmission/reception circuit base 921 to configure components other than the antenna device 10 of a circuit shown in FIG. 5, and a circuit element 923 and a transmission/reception IC 924 are mounted. The transmission/reception circuit base 921 is arranged at a predetermined position of the housing 901. The transmission/reception circuit base 921 is arranged so that mounting surfaces of the circuit element 923 and the transmission/reception IC 924 face the antenna device 10 side. A probe 925 is arranged on the front surface of the transmission/reception circuit base 921. The tip end of the probe 925 is connected to an external connection terminal 301 configured by plating the front surfaces of the external-connection land conductors 323 and 333 of the antenna device 10. Accordingly, the antenna device 10 is electrically connected to the transmission/reception circuit base 921.

In this case, since the antenna coil member 20 and the extension member 30 preferably are provided as separate members like the antenna device 10 according to this preferred embodiment, even if various types of connection configurations between the transmission/reception circuit base 921 and the antenna device 10 are present, only the configuration of the extension member 30 may be changed. For example, if a probe is used, a connecting portion of the antenna device 10 requires resistance to plating. If soldering is used, a connecting portion of the antenna device 10 requires resistance to plating and resistance to heat. If an insertion structure is used, resistance to plating and intensity (reinforcing plate (SUS)) are required. Even though the specification of the connecting portion is different, as long as the antenna coil member 20 and the extension member 30 are separate members like this preferred embodiment, only the extension member 30 may be changed in accordance with the specification. Also, since the antenna coil member 20 is not affected by the specification of the connecting portion, the antenna coil member 20 is able to be realized by a simple configuration or an inexpensive configuration.

With such a configuration, the wireless communication terminal 90 preferably has a circuit as shown in FIG. 5. The wireless communication terminal 90 includes the antenna coil member 20 and the extension member 30. The antenna coil member 20 includes an inductor L20 and a capacitor C20. The inductor L20 and the capacitor C20 define an antenna coil. A capacitive coupling portion between the above-described antenna coil member 20 and extension member 30 includes a capacitor C31 connected to one end of the antenna and a capacitor C32 connected to the other end.

The capacitor C31 is connected to the transmission/reception IC 924 through a capacitor C35 and an inductor L31. The capacitor C32 is connected to the transmission/reception IC 924 through a capacitor C36 and an inductor L32. The node between the capacitors C31 and C35 and the node between the capacitors C32 and C36 are connected through capacitors C33 and C34. The node between the capacitors C33 and C34 is connected to the ground. The node between the capacitor C35 and the inductor L31 and the node between the capacitor C36 and the inductor L32 are connected through capacitors C37 and C38. The node between the capacitors C37 and C38 is connected to the ground.

With such a configuration, a matching circuit MC including the capacitors C31, C32, C33, C34, C35, C36, C37, and C38, and the inductors L31 and L32 is realized. By using the configuration of this preferred embodiment, the capacitors C31 and C32 configuring the matching circuit MC are preferably extension members extending from the antenna coil of the antenna device 10. Accordingly, a circuit element does not have to be mounted on the transmission/reception circuit base 921, the space to realize the matching circuit MC is decreased, and the wireless communication terminal 90 is downsized. The inductors L31 and L32, and the capacitors C37 and C38 preferably configure an EMC (Electro Magnetic Compatibility) filter; however, this EMC filter may be omitted.

In the antenna device 10, the second base 31 configuring the extension member 30 may preferably use a material with low absorptivity. Since the second base 31 uses the material with low absorptivity, the dielectric constant of the layer between the inner-peripheral-end conductor 221 and the first end-portion conductor 321 and the dielectric constant of the layer between the outer-peripheral-end conductor 222 and the second end-portion conductor 331 is prevented from being changed due to the external environment. Also, since the second base 31 uses the material with low absorptivity, the thickness of the second base 31 is prevented from being changed due to the external environment. That is, the capacitance generated between the inner-peripheral-end conductor 221 and the first end-portion conductor 321 and the capacitance generated between the outer-peripheral-end conductor 222 and the second end-portion conductor 331 are prevented from being changed due to the external environment. Accordingly, the capacitances of the capacitors C31 and C32 in FIG. 5 become stable, and the characteristics of the antenna device 10 are prevented from being deteriorated.

Also, the second base 31 may preferably use a material with a small dielectric loss tangent tan δ. By using the material with a small dielectric loss tangent tan δ, loss components included in the capacitor defined by the inner-peripheral-end conductor 221, the first end-portion conductor 321, and the second base 31, and the capacitor defined by the outer-peripheral-end conductor 222, the second end-portion conductor 331, and the second base 31 are decreased. Accordingly, the loss generated at the capacitors C31 and C32 in FIG. 5 is significantly reduced or prevented, and the characteristics of the antenna device 10 are improved. In the viewpoint, the second base 31 may more preferably use liquid crystal polymer as compared with polyimide.

Figure 6A:
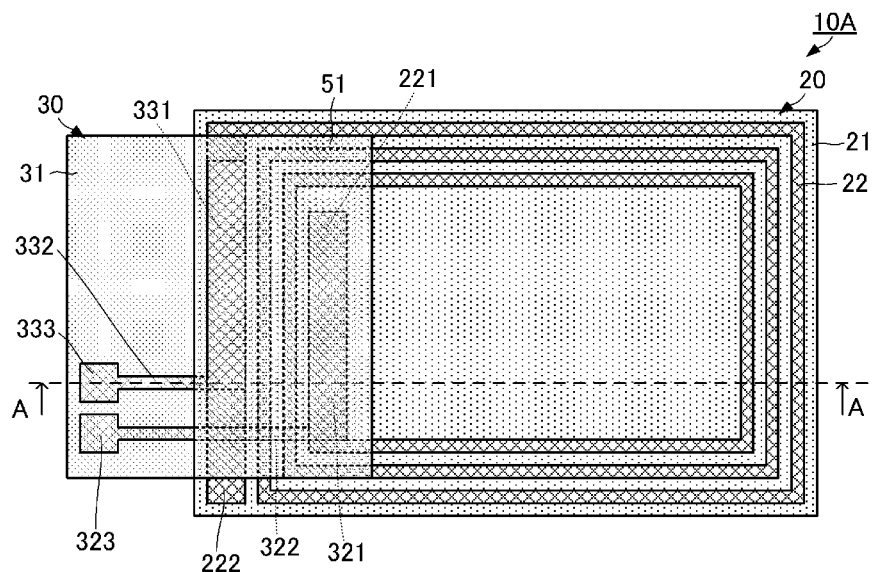
FIGS. 6A and 6B are a plan view and a side cross-sectional view of an antenna device according to a second preferred embodiment of the present invention.
Figure 6B:
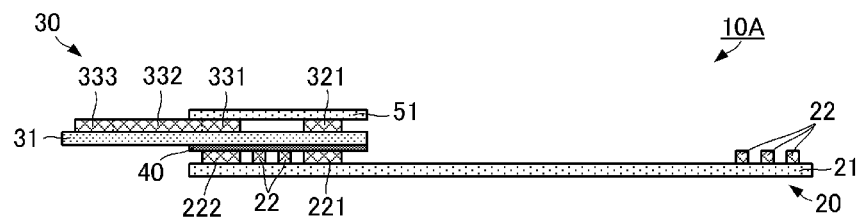

Next, an antenna device according to a second preferred embodiment of the present invention is described with reference to the drawings. FIGS. 6A and 6B are a plan view and a side cross-sectional view of the antenna device according to the second preferred embodiment of the present invention. An antenna device 10A according to this preferred embodiment differs from the antenna device 10 according to the first preferred embodiment in that a protection layer 51 is preferably added. Other configurations and aspects are preferably the same or substantially the same as the antenna device 10 according to the first preferred embodiment. Therefore, only portions different from the antenna device 10 according to the first preferred embodiment are described in detail.

As shown in FIGS. 6A and 6B, the protection layer 51 is preferably arranged at the front surface side of the extension member 30 to cover the region where the antenna coil member 20 overlaps the extension member 30 in a plan view. The protection layer 51 is configured of an insulating material with high environmental resistance.

With such a configuration, the front surface of the extension member 30, or more particularly, the first end-portion conductor 321 and the second end-portion conductor 331 are protected from the external environment by the protection layer 51. Accordingly, an antenna device with higher reliability is realized.

Figure 7A:
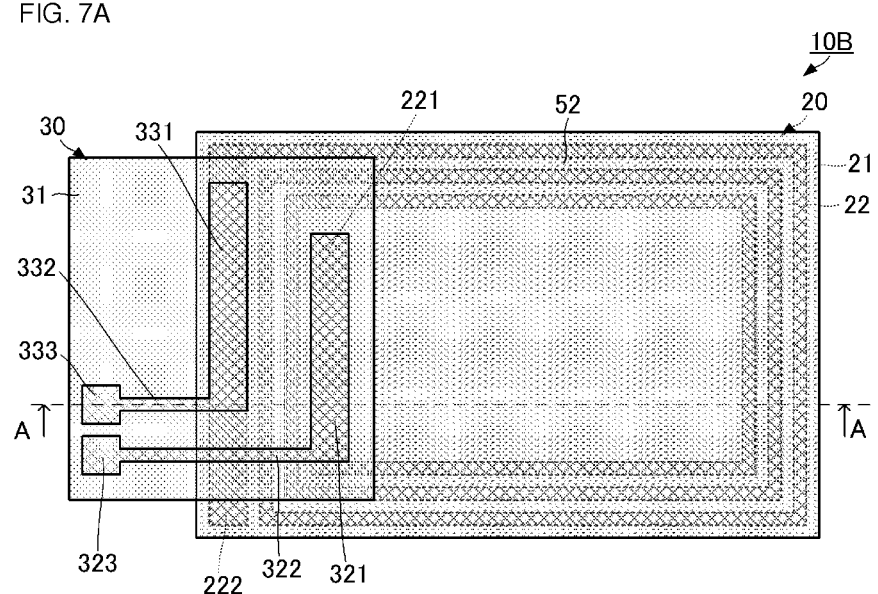
FIGS. 7A and 7B are a plan view and a side cross-sectional view of an antenna device according to a third preferred embodiment of the present invention.
Figure 7B:
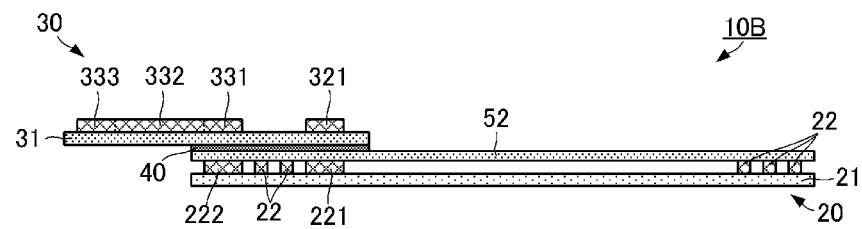

Next, an antenna device according to a third preferred embodiment of the present invention is described with reference to the drawings. FIGS. 7A and 7B are a plan view and a side cross-sectional view of the antenna device according to the third preferred embodiment of the present invention. An antenna device 10B according to this preferred embodiment differs from the antenna device 10 according to the first preferred embodiment in that a protection layer 52 is added. Other configurations and aspects are preferably the same or substantially the same as the antenna device 10 according to the first preferred embodiment. Therefore, only portions different from the antenna device 10 according to the first preferred embodiment are described in detail.

As shown in FIGS. 7A and 7B, the protection layer 52 is arranged at the front surface side of the antenna coil member 20 to cover the entire region of the antenna coil member 20 in a plan view. The protection layer 52 is configured of an insulating material with high environmental resistance. With such a configuration, the spiral conductor 22 arranged on the front surface of the antenna coil member 20 is protected by the protection layer 52 from the external environment. Accordingly, an antenna device with higher reliability is realized.

Figure 8A:
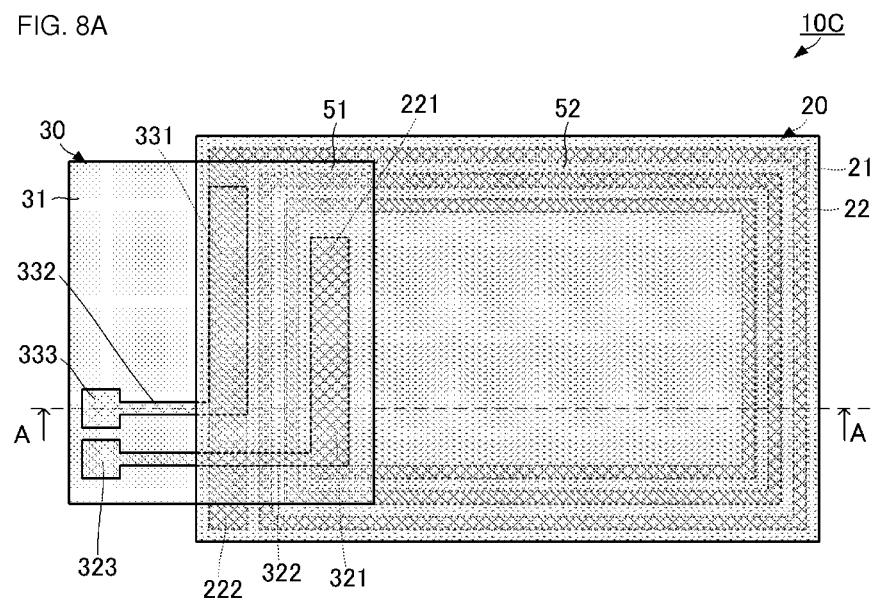
FIGS. 8A and 8B are a plan view and a side cross-sectional view of an antenna device according to a fourth preferred embodiment of the present invention.
Figure 8B:
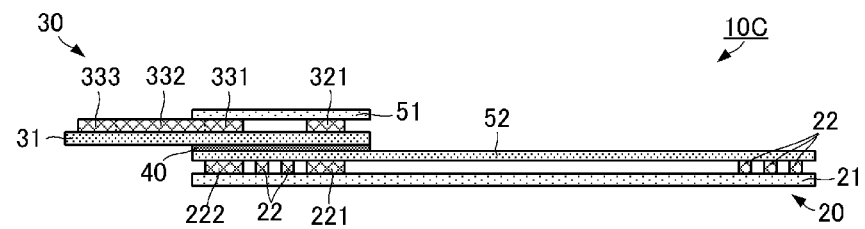

Next, an antenna device according to a fourth preferred embodiment of the present invention is described with reference to the drawings. FIGS. 8A and 8B are a plan view and a side cross-sectional view of the antenna device according to the fourth preferred embodiment of the present invention. An antenna device 10C according to this preferred embodiment differs from the antenna device 10 according to the first preferred embodiment in that the protection layers 51 and 52 are added. In other words, the antenna device 10C according to this preferred embodiment is a combination of the antenna devices 10A and 10B according to the second and third preferred embodiments. With such a configuration, all the conductors of the antenna device 10C are protected from the external environment. Accordingly, an antenna device with higher reliability is realized.

Figure 9A:
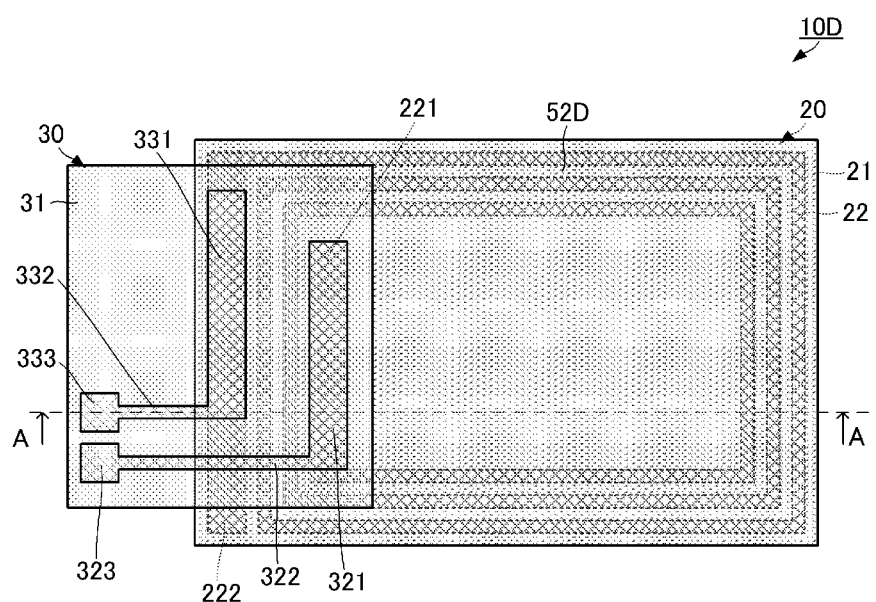
FIGS. 9A and 9B are a plan view and a side cross-sectional view of an antenna device according to a fifth preferred embodiment of the present invention.
Figure 9B:
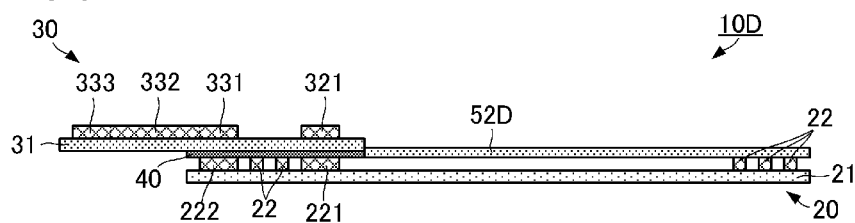

Next, an antenna device according to a fifth preferred embodiment of the present invention is described with reference to the drawings. FIGS. 9A and 9B are a plan view and a side cross-sectional view of the antenna device according to the fifth preferred embodiment of the present invention. An antenna device 10D according to this preferred embodiment differs from the antenna device 10B according to the third preferred embodiment in the shape of a protection layer 52D. The protection layer 52D is arranged to cover a region, which does not overlap an electrode of the extension member 30, at the front surface of the antenna coil member 20. With such a configuration, the spiral conductor 22 is protected from the external environment and the antenna device 10D has a significantly reduced thickness.

Figure 10A:
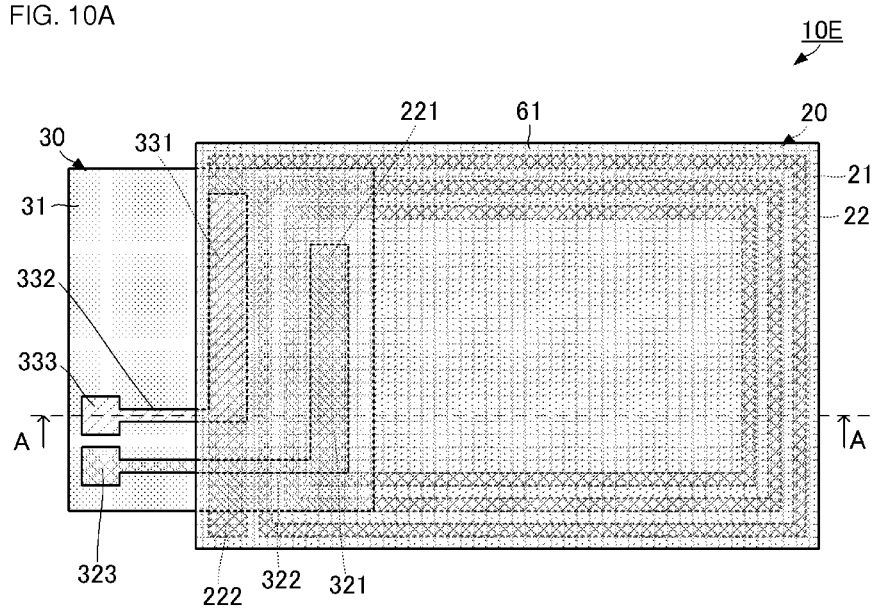
FIGS. 10A and 10B are a plan view and a side cross-sectional view of an antenna device according to a sixth preferred embodiment of the present invention.
Figure 10B:
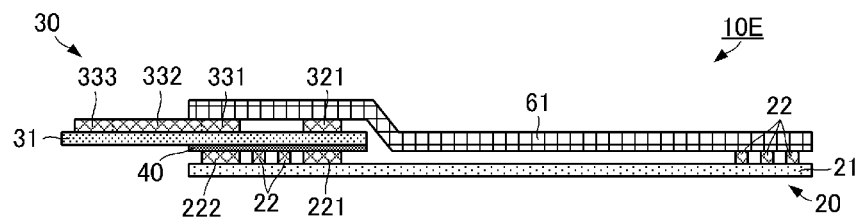

Next, an antenna device according to a sixth preferred embodiment of the present invention is described with reference to the drawings. FIGS. 10A and 10B are a plan view and a side cross-sectional view of the antenna device according to the sixth preferred embodiment of the present invention. An antenna device 10E according to this preferred embodiment differs from the antenna device 10 according to the first preferred embodiment in that a magnetic substance sheet 61 is preferably added. Other configurations and aspects are preferably the same or substantially the same as the antenna device 10 according to the first preferred embodiment. Therefore, only portions different from the antenna device 10 according to the first preferred embodiment are described in detail.

As shown in FIGS. 10A and 10B, the magnetic substance sheet 61 is arranged to cover the front surface side of the antenna coil member 20. With such a configuration, characteristics of the antenna coil are improved.

Figure 11:
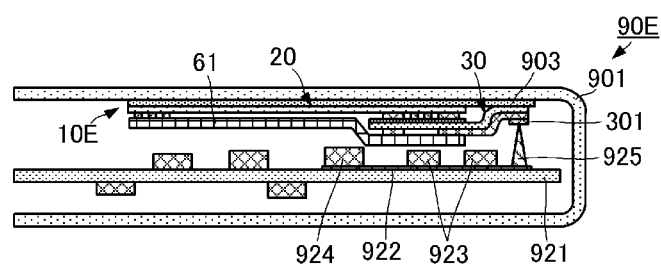
FIG. 11 is a partial side view of a wireless communication terminal according to the sixth preferred embodiment of the present invention.

As shown in FIG. 11, the antenna device 10E with such a configuration is mounted on a wireless communication terminal as shown in FIG. 11. FIG. 11 is a partial side view of a wireless communication terminal according to the sixth preferred embodiment of the present invention. A wireless communication terminal 90E according to this preferred embodiment is configured such that the antenna device 10 in the wireless communication terminal 90 according to the first preferred embodiment is replaced with the antenna device 10E according to this preferred embodiment. Other configurations and aspects are preferably the same or substantially the same as the wireless communication terminal 90 according to the first preferred embodiment. With such a configuration, effects and advantages similar to those of the first preferred embodiment are obtained. In addition, since the magnetic flux penetrating through the antenna coil is increased by the magnetic substance, the characteristics of the antenna are improved, and a magnetic shied effect that decreases the magnetic flux directed toward the substrate side are obtained (unnecessary coupling with peripheral components are reduced).

Figure 12A:
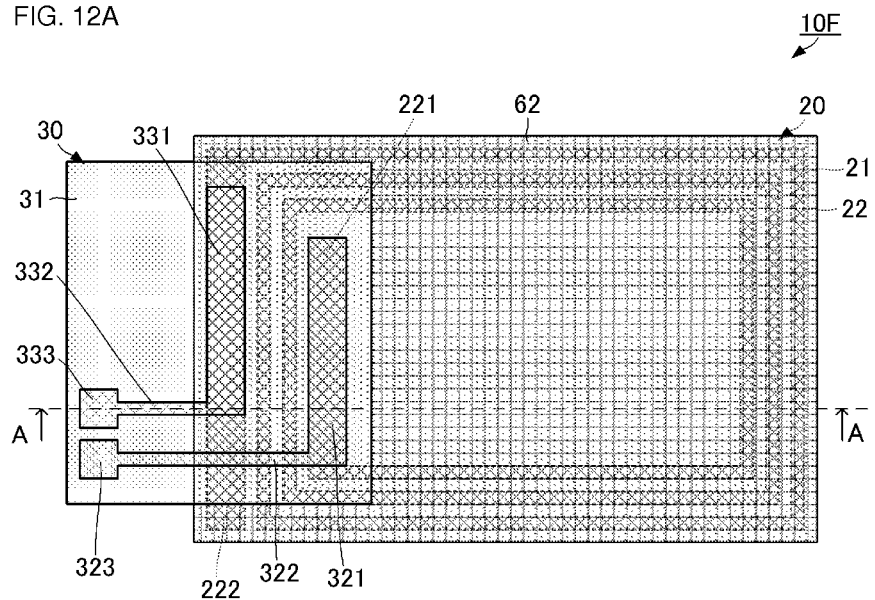
FIGS. 12A and 12B are a plan view and a side cross-sectional view of an antenna device according to a seventh preferred embodiment of the present invention.
Figure 12B:
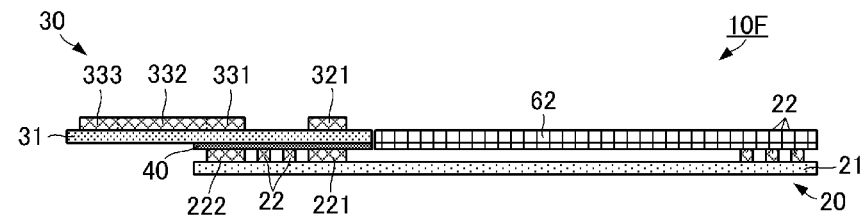

Next, an antenna device according to a seventh preferred embodiment of the present invention is described with reference to the drawings. FIGS. 12A and 12B are a plan view and a side cross-sectional view of the antenna device according to the seventh preferred embodiment of the present invention. An antenna device 10F according to this preferred embodiment preferably uses a magnetic substance sheet 62 instead of the magnetic substance sheet 61 of the antenna device 10E according to the sixth preferred embodiment. Other configurations and aspects preferably are the same or substantially the same as the antenna device 10E according to the sixth preferred embodiment.

The magnetic substance sheet 62 is arranged to cover the entirety of a region, which does not overlap the extension member 30, at the front surface side of the antenna coil member 20. With such a configuration, similarly to the sixth preferred embodiment, the characteristics of the antenna are improved by the magnetic substance and the thickness of the antenna device is decreased.

Figure 13A:
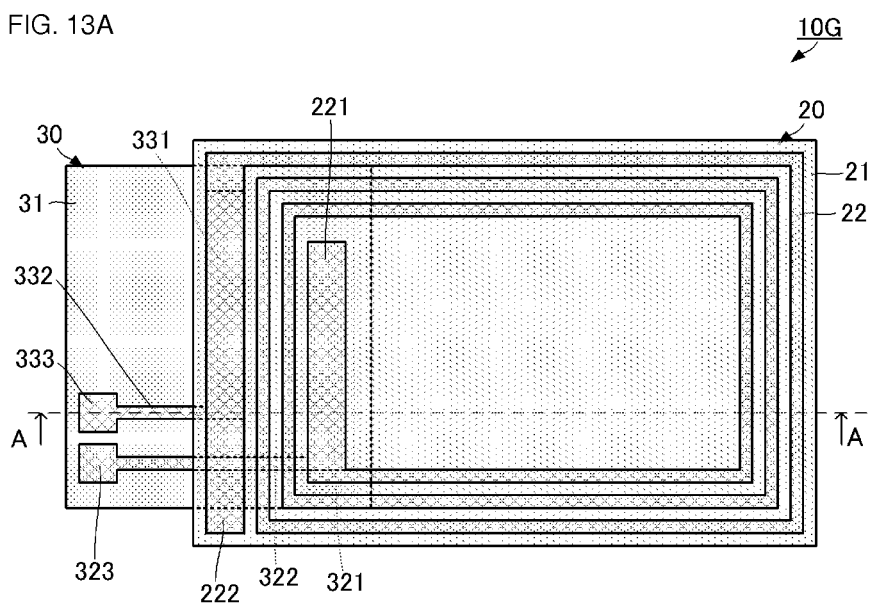
FIGS. 13A and 13B are a plan view and a side cross-sectional view of an antenna device according to an eighth preferred embodiment of the present invention.
Figure 13B:
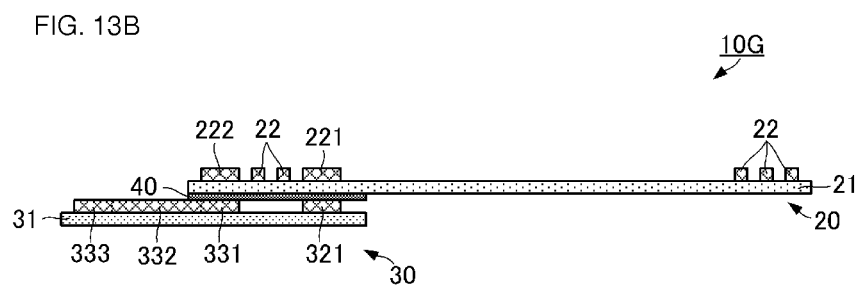

Next, an antenna device according to an eighth preferred embodiment of the present invention is described with reference to the drawings. FIGS. 13A and 13B are a plan view and a side cross-sectional view of the antenna device according to the eighth preferred embodiment of the present invention. An antenna device 10G according to this preferred embodiment differs from the antenna device 10 according to the first preferred embodiment in the positional relationship between the antenna coil member 20 and the extension member 30. The configurations of the antenna coil member 20 and the extension member 30 preferably are the same or substantially the same as those of the antenna device 10 according to the first preferred embodiment.

The extension member 30 is arranged at the back surface side of the first base 21 of the antenna coil member 20. The extension member 30 is bonded to the antenna coil member 20 by the adhesive layer 40. With such a configuration, an antenna device with high reliability and a simple configuration is realized. Also, with the configuration of this preferred embodiment, a conductor non-formation side of the extension member 30 is bonded to the housing case. Hence, the housing also defines and functions as a reinforcing plate for the external-connection land conductor, and a step is not generated when the tip end of a spring pin is pressed to the external-connection land conductor. Accordingly, connection reliability between the external-connection land conductor and the spring pin is greatly improved.

Figure 14A:
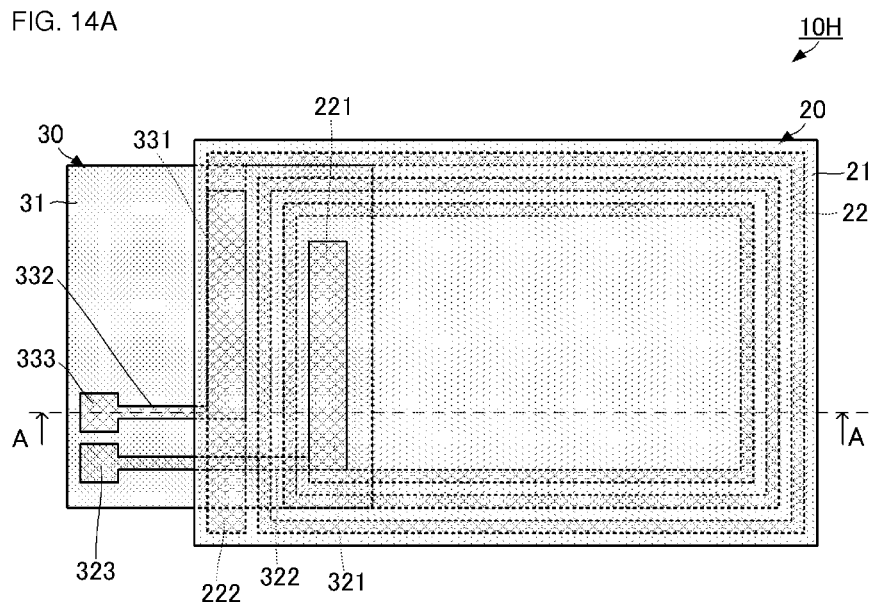
FIGS. 14A and 14B are a plan view and a side cross-sectional view of an antenna device according to a ninth preferred embodiment of the present invention.
Figure 14B:
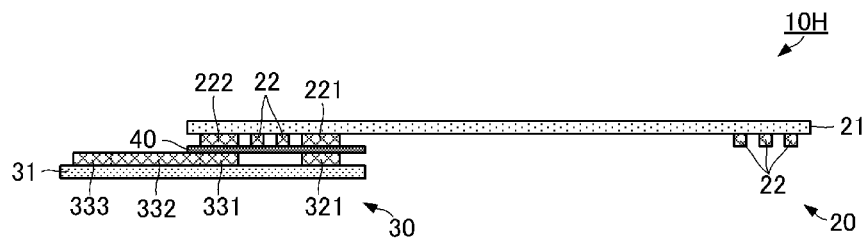

Next, an antenna device according to a ninth preferred embodiment of the present invention is described with reference to the drawings. FIGS. 14A and 14B are a plan view and a side cross-sectional view of the antenna device according to the ninth preferred embodiment of the present invention. An antenna device 10H according to this preferred embodiment differs from the antenna device 10G according to the eighth preferred embodiment in that the orientation of the front and back surfaces of the antenna coil member 20 preferably are inverted. That is, the antenna coil member 20 and the extension member 30 are arranged so that their front surfaces face each other. With such a configuration, an antenna device with high reliability and a simple configuration is realized.

Figure 15A:
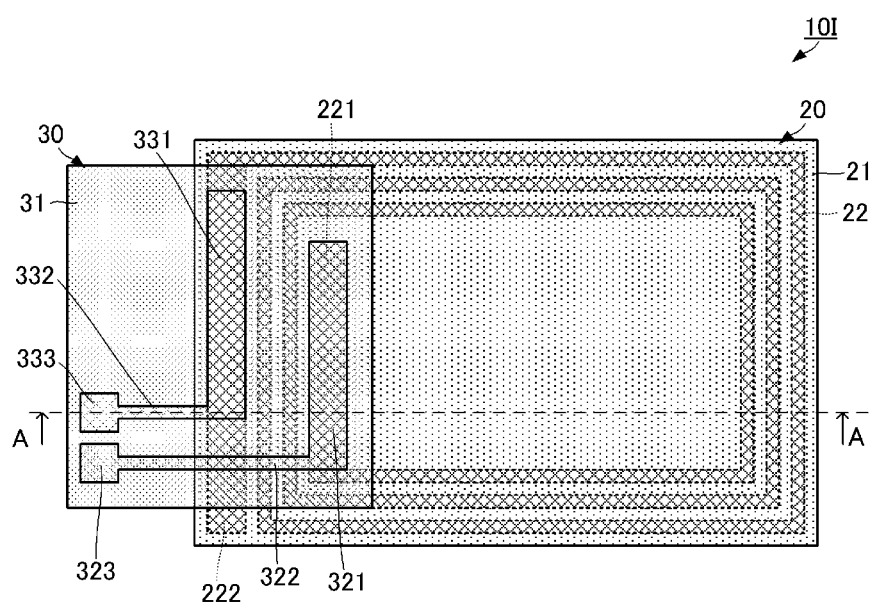
FIGS. 15A and 15B are a plan view and a side cross-sectional view of an antenna device according to a tenth preferred embodiment of the present invention.
Figure 15B:
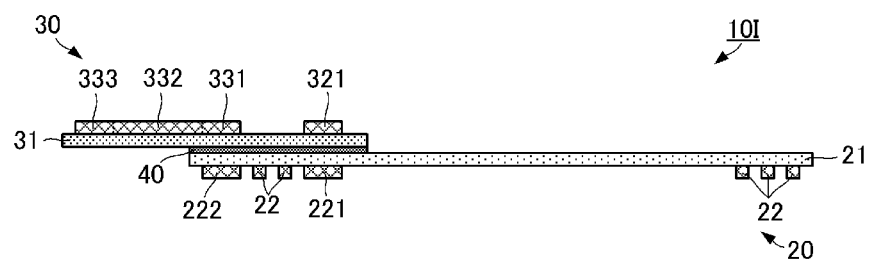

Next, an antenna device according to a tenth preferred embodiment of the present invention is described with reference to the drawings. FIGS. 15A and 15B are a plan view and a side cross-sectional view of the antenna device according to the tenth preferred embodiment of the present invention. An antenna device 10I according to this preferred embodiment differs from the antenna device 10 according to the first preferred embodiment in that the orientations of the front and back surfaces of the antenna coil member 20 preferably are inverted. That is, the antenna coil member 20 and the extension member 30 are arranged so that their back surfaces face each other. With such a configuration, an antenna device with high reliability and a simple configuration is realized. Also, with the configuration of this preferred embodiment, since the conductor non-formation surface of the antenna coil member 20 is bonded to the conductor non-formation surface of the extension member 30, there is no projection or recess due to the conductor pattern on the bonding surfaces, and hence the distance between the inner-peripheral-end conductor and the first end-portion conductor and the distance between the outer-peripheral-end conductor and the second end-portion conductor are stably constant. Accordingly, the capacitance of the capacitor obtained because the inner-peripheral-end conductor faces the first end-portion conductor, and the capacitance of the capacitor obtained because the outer-peripheral-end conductor faces the second end-portion conductor are stable.

Figure 16A:
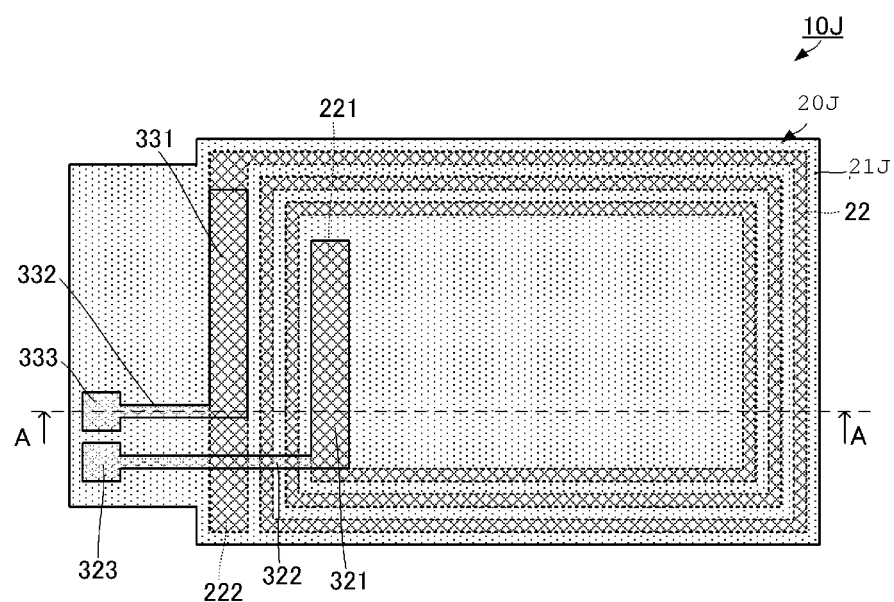
FIGS. 16A and 16B are a plan view and a side cross-sectional view of an antenna device according to an eleventh preferred embodiment of the present invention.
Figure 16B:
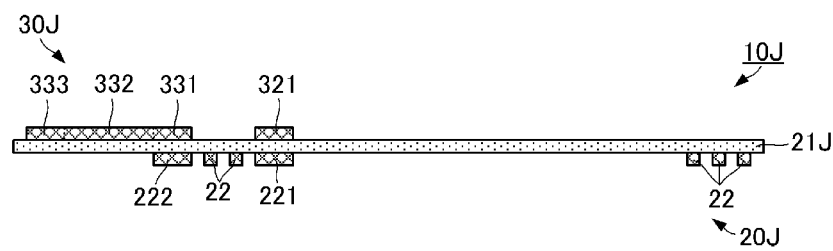

Next, an antenna device according to an eleventh preferred embodiment of the present invention is described with reference to the drawings. FIGS. 16A and 16B are a plan view and a side cross-sectional view of the antenna device according to the eleventh preferred embodiment of the present invention. An antenna device 10J according to this preferred embodiment differs from the antenna device 10I according to the tenth preferred embodiment in that the first base 21 and the second base 31 are integrated and define and function as a base 21J. That is, the conductor pattern of the extension member 30J is provided at the front surface side of the base 21J, and the conductor pattern of the antenna coil member 20J is provided at the back surface side of the base 21J. With such a configuration, an antenna device with high reliability and a simple configuration is realized. Further, with the configuration of this preferred embodiment, a thinner antenna device with a smaller number of components is realized.

Figure 17A:
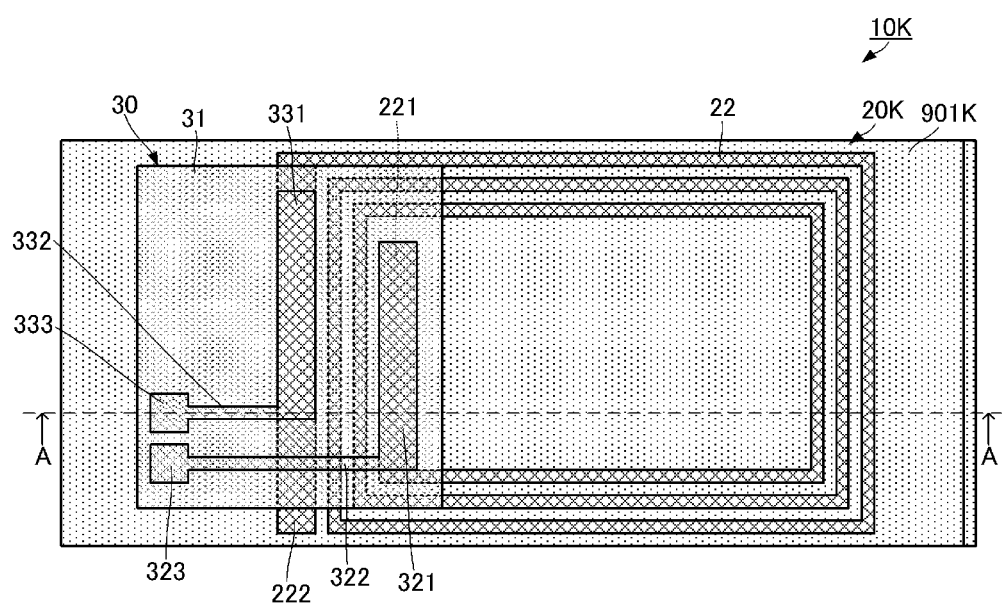
FIGS. 17A and 17B are a plan view and a side cross-sectional view of an antenna device according to a twelfth preferred embodiment of the present invention.
Figure 17B:
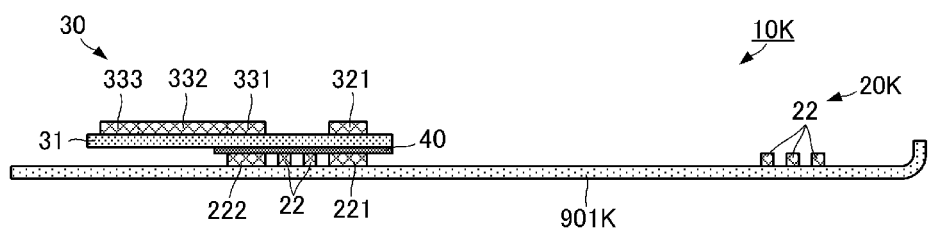

Next, an antenna device according to a twelfth preferred embodiment of the present invention is described with reference to the drawings. FIGS. 17A and 17B are a plan view and a side cross-sectional view of the antenna device according to the twelfth preferred embodiment of the present invention. An antenna device 10K according to this preferred embodiment differs from the antenna device 10 according to the first preferred embodiment in that a housing 901K of a wireless communication terminal is used instead of the first base 21. That is, the housing 901K of the wireless communication terminal includes an insulating material, and the conductor pattern of the antenna coil member 20K is provided on the inner wall surface of the housing 901K. With such a configuration, an antenna device with high reliability and a simple configuration is realized. The thickness of the wireless communication terminal is further decreased.

Figure 18A:
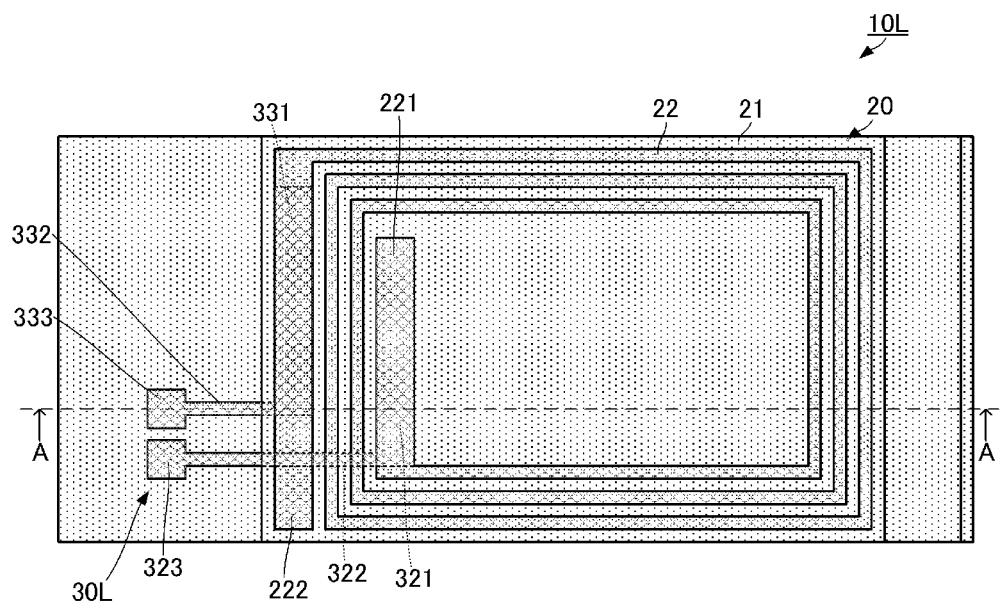
FIGS. 18A and 18B are a plan view and a side cross-sectional view of an antenna device according to a thirteenth preferred embodiment of the present invention.
Figure 18B:
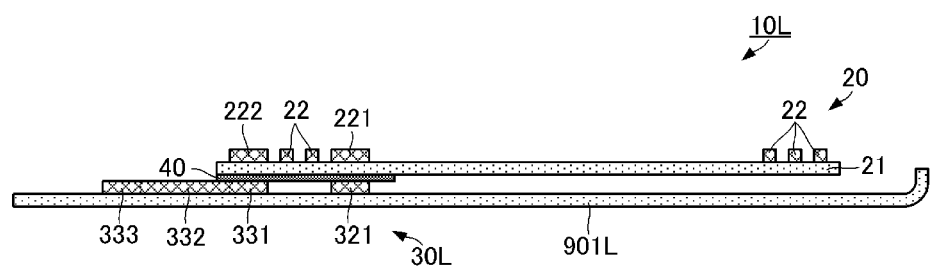

Next, an antenna device according to a thirteenth preferred embodiment of the present invention is described with reference to the drawings. FIGS. 18A and 18B are a plan view and a side cross-sectional view of the antenna device according to the thirteenth preferred embodiment of the present invention. An antenna device 10L according to this preferred embodiment differs from the antenna device 10G according to the eighth preferred embodiment in that a housing 901L of a wireless communication terminal preferably is used instead of the first base 21. That is, the housing 901L of the wireless communication terminal is made of an insulating material, and the conductor pattern of the antenna coil member 20 is provided on the inner wall surface of the housing 901L. With such a configuration, an antenna device with high reliability and a simple configuration is realized. The thickness of the wireless communication terminal is further decreased.

Figure 19A:
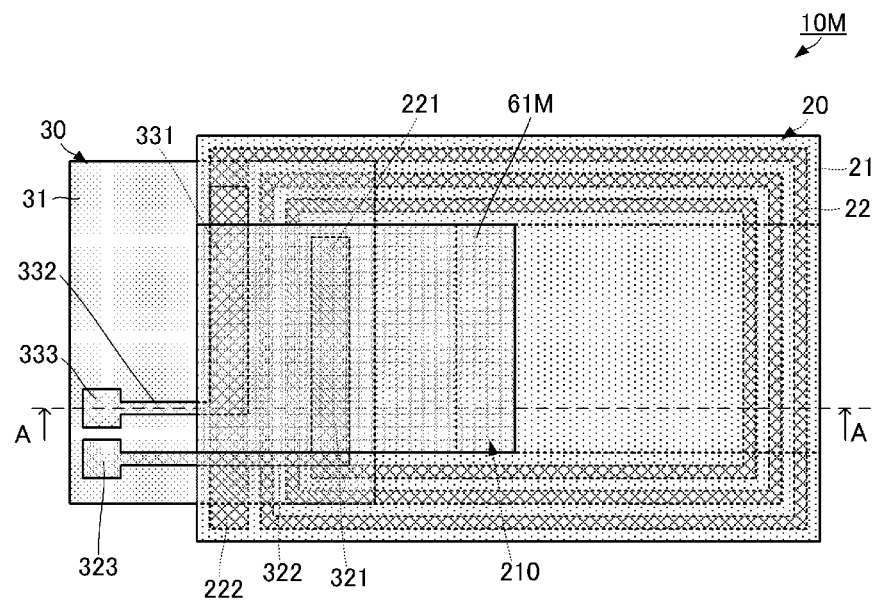
FIGS. 19A and 19B are a plan view and a side cross-sectional view of an antenna device according to a fourteenth preferred embodiment of the present invention.
Figure 19B:
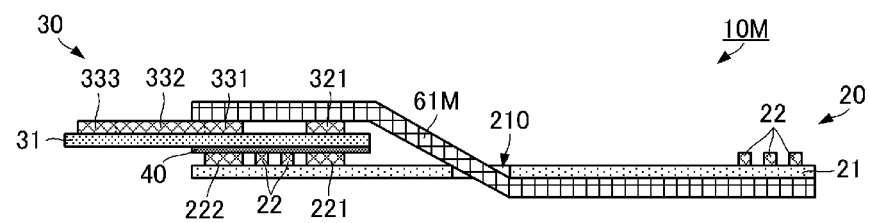

Next, an antenna device according to a fourteenth preferred embodiment of the present invention is described with reference to the drawings. FIGS. 19A and 19B are a plan view and a side cross-sectional view of the antenna device according to the fourteenth preferred embodiment of the present invention. An antenna device 10M according to this preferred embodiment preferably uses a magnetic substance sheet 61M instead of the magnetic substance sheet 61 of the antenna device 10E according to the sixth preferred embodiment.

A penetrating groove 210 is provided in the first base 21. The magnetic substance sheet 61M passes through the penetrating groove 210, covers the front surface side of the first base 21 at the extension member 30 side, and covers the back surface side of the first base 21 at the extension member 30 side. With such a configuration, an antenna device with high reliability and a simple configuration is realized. Further, with use of the configuration of this preferred embodiment, the directivity is easily changed depending on the way of bonding the magnetic substance sheet, and the characteristics of the antenna are improved.

Figure 20:
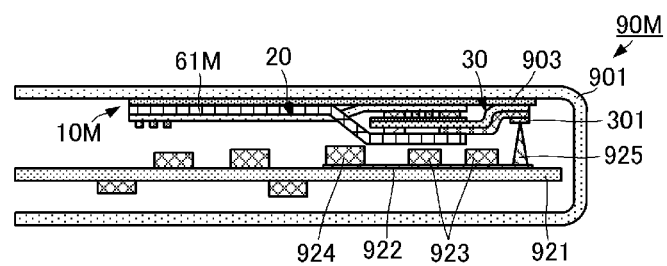
FIG. 20 is a partial side view of a wireless communication terminal according to the fourteenth preferred embodiment of the present invention.

The antenna device 10M with such a configuration preferably is mounted on a wireless communication terminal as shown in FIG. 20. FIG. 20 is a partial side view of the wireless communication terminal according to the fourteenth preferred embodiment of the present invention. A wireless communication terminal 90M according to this preferred embodiment is configured such that the antenna device 10E in the wireless communication terminal 90E according to the sixth preferred embodiment is replaced with the antenna device 10M according to this preferred embodiment. Other configurations and aspects preferably are the same or substantially the same as the wireless communication terminal 90E according to the sixth preferred embodiment. With such a configuration, effects and advantages similar to those of the sixth preferred embodiment are obtained. Further, with use of the arrangement configuration of the magnetic substance sheet 61M of this preferred embodiment, the characteristics of the antenna of the wireless communication terminal 90M are improved.

Figure 21A:
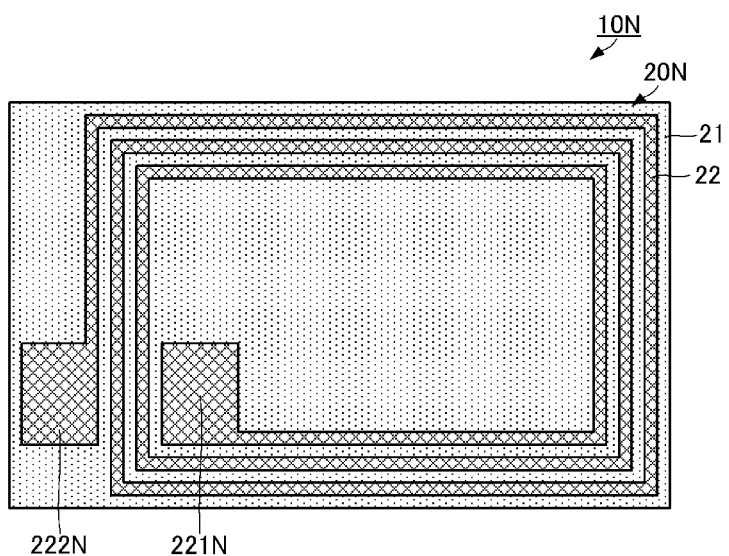
FIGS. 21A and 21B are a plan view of an antenna device and a plan view of an extension member according to a fifteenth preferred embodiment of the present invention.
Figure 21B:
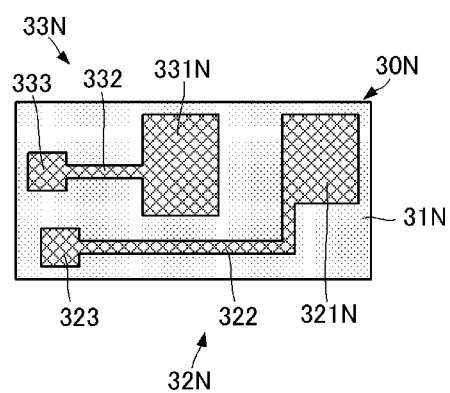

Next, an antenna device according to a fifteenth preferred embodiment of the present invention is described with reference to the drawings. FIGS. 21A and 21B are a plan view of an antenna device and a plan view of an extension member according to a fifteenth preferred embodiment of the present invention. An antenna device 10N according to this preferred embodiment differs from the antenna device 10 according to the first preferred embodiment in the shapes of an inner-peripheral-end conductor 221N, an outer-peripheral-end conductor 222N, a first end-portion conductor 321N, and a second end-portion conductor 331N. Other configurations and aspects preferably are the same or substantially the same as the antenna device 10 according to the first preferred embodiment.

The inner-peripheral-end conductor 221N, the outer-peripheral-end conductor 222N, the first end-portion conductor 321N, and the second end-portion conductor 331N preferably are square or substantially square. The shapes of the inner-peripheral-end conductor, outer-peripheral-end conductor, first end-portion conductor, and second end-portion conductor may be any shapes as long as the shapes can provide desirable capacitive coupling. At this time, the inner-peripheral-end conductor and the outer-peripheral-end conductor preferably have larger widths than the width of the spiral conductor, and the first end-portion conductor and the second end-portion conductor preferably have larger widths than the widths of the first and second extension conductor patterns.

Figure 22A:
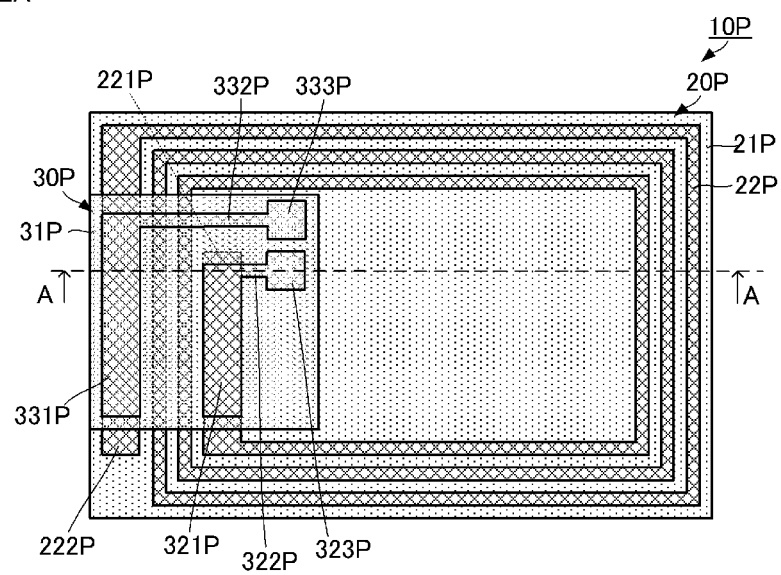
FIGS. 22A and 22B are a plan view and a side cross-sectional view of an antenna device according to a sixteenth preferred embodiment of the present invention.
Figure 22B:
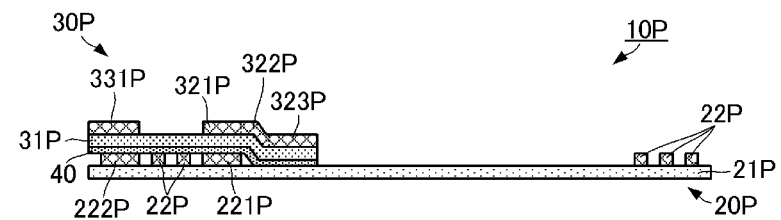

Next, an antenna device according to a sixteenth preferred embodiment of the present invention is described with reference to the drawings. FIGS. 22A and 22B are a plan view and a side cross-sectional view of the antenna device according to the sixteenth preferred embodiment of the present invention. An antenna device 10P according to this preferred embodiment differs from the antenna device 10 according to the first preferred embodiment in the positional relationship between an extension member 30P and an antenna coil member 20P. The extension member 30P and the antenna coil member 20P preferably have the same basic structures as those of the extension member and the antenna coil member 20 according to the first preferred embodiment.

The extension member 30P includes a second base 31P, a first end-portion conductor 321P, a first extension conductor pattern 322P, a second end-portion conductor 331P, a second extension conductor pattern 332P, and external-connection land conductors 323P and 333P.

In a plan view of the antenna device 10P, the first end-portion conductor 321P of the extension member 30P overlaps an inner-peripheral-end conductor 221P of the antenna coil member 20P, the second end-portion conductor 331P of the extension member 30P overlaps an outer-peripheral-end conductor 222P of the antenna coil member 20P.

In a plan view of the antenna device 10P, the external-connection land conductor 323P or 333P of the extension member 30P does not overlap a spiral conductor 22P of the antenna coil member 20P and is arranged in a region surrounded by the spiral conductor 22P of the antenna coil member 20P. The external-connection land conductors 323P and 333P are closely arranged in a mutually separated state.

The first extension conductor pattern 322P connects the first end-portion conductor 321P with the external-connection land conductor 323P. At this time, the first extension conductor pattern 322P preferably connects the first end-portion conductor 321P with the external-connection land conductor 323P by the minimum distance.

The second extension conductor pattern 332P connects the second end-portion conductor 331P with the external-connection land conductor 323P. The second extension conductor pattern 332P preferably extends in a direction perpendicular or substantially perpendicular to the spiral conductor 22P at a position of intersection in a plan view, and preferably connects the second end-portion conductor 331P with the external-connection land conductor 323P by the minimum distance.

With such a configuration, if the antenna coil member 20P and the antenna coil member 20 have the same area or substantially the same area, the antenna device 10P is able to be configured in a smaller area than that of the antenna device 10. Also, if the antenna device 10P and the antenna device 10 have the same outer peripheral shape, the antenna coil member 20P is able to have a larger area. That is, a large ring shape of the spiral conductor 22P is ensured, the area of an opening surrounded by the spiral conductor 22P is increased, and radiation characteristics are improved.

Also, as described above, by significantly reducing or minimizing the extension to the external-connection land conductors 323P and 333P, deterioration in radiation characteristics is reduced.

Also, by using the configuration of this preferred embodiment, a first base 21P of the antenna coil member 20P defines and functions as a reinforcing member for the external-connection land conductors 323P and 333P. Accordingly, when the above-described probe, etc. contacts the external-connection land conductors 323P and 333P, the intensities of the external-connection land conductors 323P and 333P are increased. Accordingly, connection reliability of the external-connection land conductors 323P and 333P with respect to an external device is significantly improved.

As shown in FIGS. 22A and 22B, the region where the external-connection land conductors 323P and 333P are provided in the extension member 30P is preferably bonded to the antenna coil member 20P through the adhesive layer 40.

Figure 23A:
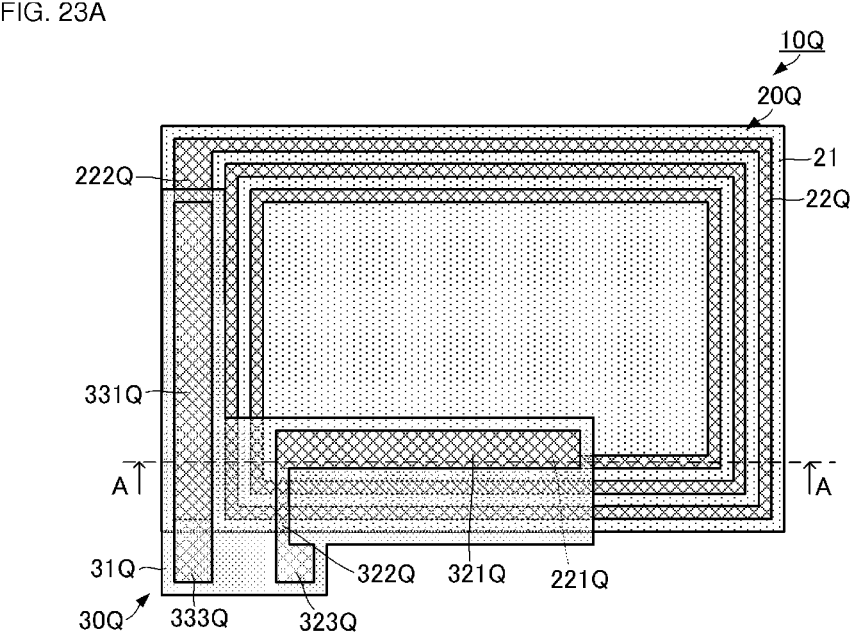
FIGS. 23A and 23B are a plan view and a side cross-sectional view of an antenna device according to a seventeenth preferred embodiment of the present invention.
Figure 23B:
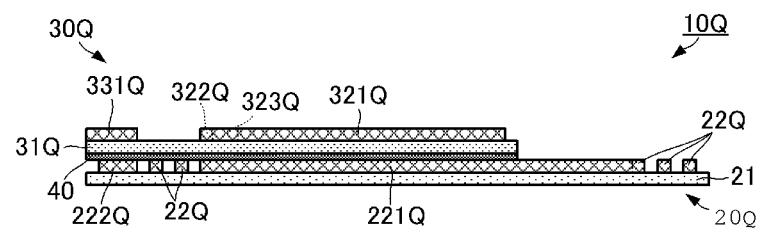

Next, an antenna device according to a seventeenth preferred embodiment of the present invention is described with reference to the drawings. FIGS. 23A and 23B are a plan view and a side cross-sectional view of the antenna device according to the seventeenth preferred embodiment of the present invention. An antenna device 10Q according to this preferred embodiment differs from the antenna device 10 according to the first preferred embodiment in the position at which an extension member 30Q and an antenna coil member 20Q have capacitive coupling.

An inner-peripheral-end conductor 221Q and an outer-peripheral-end conductor 222Q of the antenna coil member 20Q are parallel or substantially parallel to respective different sides of the first base 21.

In a plan view of the antenna device 10Q, a first end-portion conductor 321Q of the extension member 30Q overlaps the inner-peripheral-end conductor 221Q of the antenna coil member 20Q. In a plan view of the antenna device 10Q, a second end-portion conductor 331Q of the extension member 30Q overlaps the outer-peripheral-end conductor 222Q of the antenna coil member 20Q.

In a plan view of the antenna device 10Q, the external-connection land conductors 323Q and 333Q are arranged so as not to overlap the antenna coil member 20Q. The external-connection land conductors 323Q and 333Q are closely arranged in a mutually separated state. The external-connection land conductor 323Q is connected to the first end-portion conductor 321Q through the first extension conductor pattern 322Q. The external-connection land conductor 333Q is connected to one end of the second end-portion conductor 331Q.

With such a configuration, effects and advantages similar to those of the antenna device 10 according to the first preferred embodiment are obtained. Also, since such a configuration is used, the degree of freedom for design as the antenna device is improved.

Figure 24A:
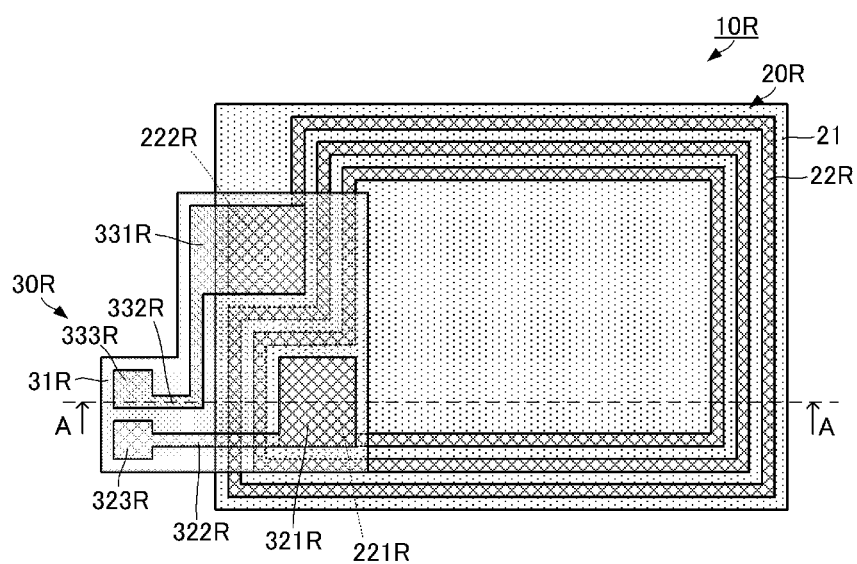
FIGS. 24A and 24B are a plan view and a side cross-sectional view of an antenna device according to an eighteenth preferred embodiment of the present invention.
Figure 24B:
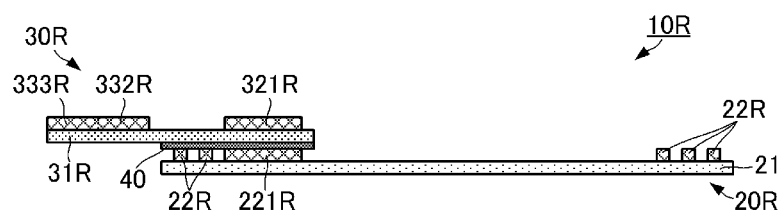

Next, an antenna device according to an eighteenth preferred embodiment of the present invention is described with reference to the drawings. FIGS. 24A and 24B are a plan view and a side cross-sectional view of the antenna device according to the eighteenth preferred embodiment of the present invention. An antenna device 10R according to this preferred embodiment differs from the antenna device 10N according to the fifteenth preferred embodiment in the positional relationship between an inner-peripheral-end conductor 221R and an outer-peripheral end conductor 222R.

The inner-peripheral-end conductor 221R and the outer-peripheral-end conductor 222R are arranged along a side of the first base 21 close to the inner-peripheral-end conductor 221R and the outer-peripheral-end conductor 222R.

In a plan view of the antenna device 10R, a first end-portion conductor 321R of an extension member 30R overlaps the inner-peripheral-end conductor 221R of an antenna coil member 20R. In a plan view of the antenna device 10R, a second end-portion conductor 331R of the extension member 30R overlaps the outer-peripheral-end conductor 222R of the antenna coil member 20R.

In a plan view of the antenna device 20R, external-connection land conductors 323R and 333R are arranged so as not to overlap the antenna coil member 20R. The external-connection land conductors 323R and 333R are closely arranged in a mutually separated state. The external-connection land conductor 323R is connected to the first end-portion conductor 321R through a first extension conductor pattern 322R. The external-connection land conductor 333R is connected to the second end-portion conductor 331R through a second extension conductor pattern 332R.

With such a configuration, effects and advantages similar to those of the antenna device 10N according to the fifteenth preferred embodiment are obtained. Also, since such a configuration is used, the degree of freedom for design as the antenna device is improved.

Figure 25A:
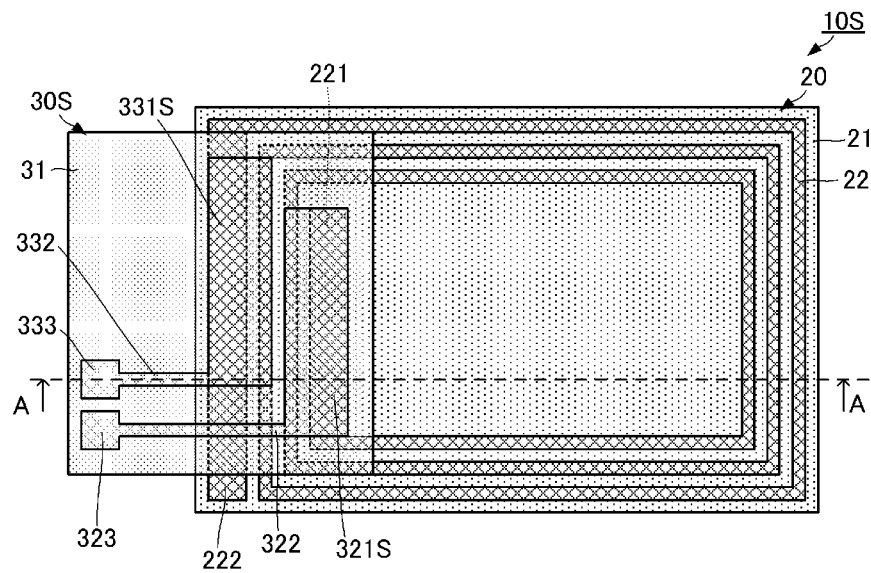
FIGS. 25A and 25B are a plan view and a side cross-sectional view of an antenna device according to a nineteenth preferred embodiment of the present invention.
Figure 25B:
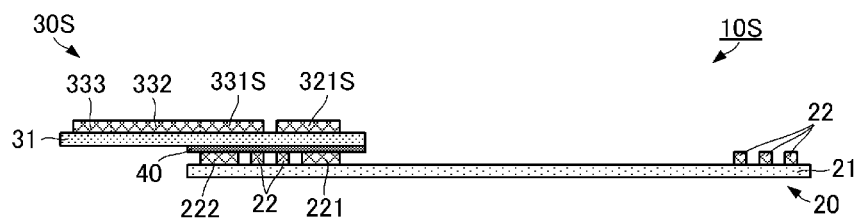

Next, an antenna device according to a nineteenth preferred embodiment of the present invention is described with reference to the drawings. FIGS. 25A and 25B are a plan view and a side cross-sectional view of the antenna device according to the nineteenth preferred embodiment of the present invention. An antenna device 10S according to this preferred embodiment differs from the antenna device 10 according to the first preferred embodiment in the position at which an extension member 30S and the antenna coil member 20 have capacitive coupling.

The extension member 30S includes the second base 31, a first end-portion conductor 321S, the first extension conductor pattern 322, a second end-portion conductor 331S, the second extension conductor pattern 332, and the external-connection land conductors 323 and 333.

In a plan view of the antenna device 10S, the first end-portion conductor 321S of the extension member 30S overlaps the inner-peripheral-end conductor 221 and a portion of the spiral conductor 22 of the antenna coil member 20. The portion of the spiral conductor 22 overlapping the first end-portion conductor 321S is a portion extending parallel or substantially parallel to the extending direction of the inner-peripheral-end conductor 221. The second end-portion conductor 331S of the extension member 30S overlaps the outer-peripheral-end conductor 222 and a portion of the spiral conductor 22 of the antenna coil member 20. The portion of the spiral conductor 22 overlapping the second end-portion conductor 331S is a portion extending parallel or substantially parallel to the extending direction of the outer-peripheral-end conductor 222.

With such a configuration, the first end-portion conductor 321S and the second end-portion conductor 331S have capacitive coupling with the spiral conductor 22 in addition to the inner-peripheral-end conductor 221 and the outer-peripheral-end conductor 222. Accordingly, a larger capacitance is obtained as a capacitor that performs antenna matching as compared with the antenna device 10 according to the first preferred embodiment.

In this preferred embodiment, both the first end-portion conductor 321S and the second end-portion conductor 331S overlap the spiral conductor 22; however, only one of the first end-portion conductor 321S and the second end-portion conductor 331S may overlap the spiral conductor 22. However, as described above, if the configuration of outputting a balanced signal is used, the area that the first end-portion conductor 321S overlaps the inner-peripheral-end conductor 221 and the spiral conductor 22 is preferably the same as the area that the second end-portion conductor 331S overlaps the outer-peripheral-end conductor 222 and the spiral conductor 22.

Figure 26:
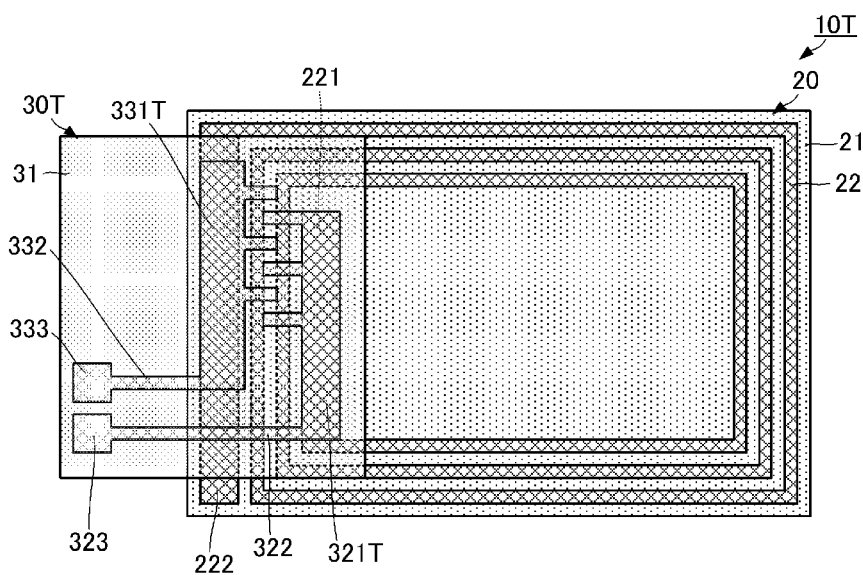
FIG. 26 is a plan view of an antenna device according to a twentieth preferred embodiment of the present invention.

Next, an antenna device according to a twentieth preferred embodiment of the present invention is described with reference to the drawings. FIG. 26 is a plan view of the antenna device according to the twentieth preferred embodiment of the present invention. An antenna device 10T according to this preferred embodiment differs from the antenna device 10S according to the nineteenth preferred embodiment in the region where an extension member 30T and the antenna coil member 20 have capacitive coupling.

The extension member 30T includes the second base 31, a first end-portion conductor 321T, the first extension conductor pattern 322, a second end-portion conductor 331T, the second extension conductor pattern 332, and the external-connection land conductors 323 and 333.

In a plan view of the antenna device 10T, the first end-portion conductor 321T of the extension member 30T includes a plurality of first capacitive coupling projections. These first capacitive coupling projections overlap a portion of the spiral conductor 22 of the antenna coil member 20. The portion of the spiral conductor 22 overlapping the first capacitive coupling projections extends parallel or substantially parallel to the extending direction of the inner-peripheral-end conductor 221, and is adjacent to the inner-peripheral-end conductor 221.

The second end-portion conductor 331S of the extension member 30T includes a plurality of second capacitive coupling projections. These second capacitive coupling projections overlap a portion of the spiral conductor 22 of the antenna coil member 20. The portion of the spiral conductor 22 overlapping the second capacitive coupling projections extends parallel or substantially parallel to the extending direction of the outer-peripheral-end conductor 222, and is adjacent to the outer-peripheral-end conductor 222.

With such a configuration, the first end-portion conductor 321R and the second end-portion conductor 331R have capacitive coupling with the spiral conductor 22 in addition to the inner-peripheral-end conductor 221 and the outer-peripheral-end conductor 222. Accordingly, the antenna device 10 according to the first preferred embodiment obtains a larger capacitance as a capacitor for antenna matching. Further, by adjusting the shapes of the first and second capacitive coupling projections, the capacitance is adjusted.

In this preferred embodiment, both the first end-portion conductor 321R and the second end-portion conductor 331R have the same shape and the same number of capacitive coupling projections; however, one of the first end-portion conductor and the second end-portion conductor may have the capacitive coupling projections, or the shapes and areas of the first end-portion conductor may differ from those of the second end-portion conductor. However, as described above, if the configuration of outputting a balanced signal is used, the area that the first end-portion conductor 321R including the first capacitive coupling projections overlaps the inner-peripheral-end conductor 221 and the spiral conductor 22 is preferably the same as the area that the second end-portion conductor 331R including the second capacitive coupling projections overlaps the outer-peripheral-end conductor 222 and the spiral conductor 22.

Figure 27A:
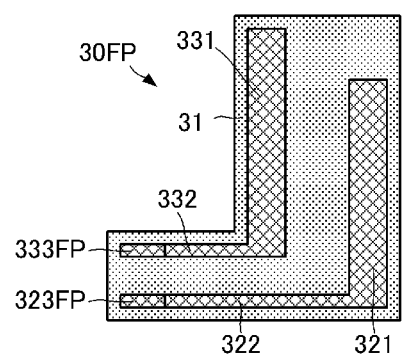
FIGS. 27A and 27B are plan views showing a plurality of kinds of shapes each configuring an extension member of an antenna device according to a twenty-first preferred embodiment of the present invention.
Figure 27B:
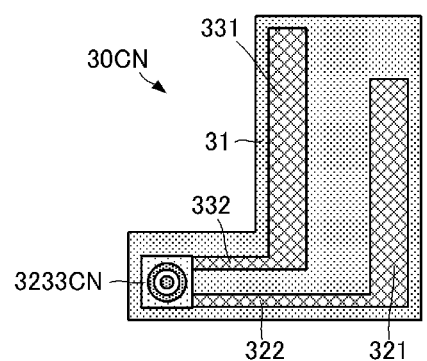

Next, an antenna device according to a twenty-first preferred embodiment of the present invention is described with reference to the drawings. FIGS. 27A and 27B are plan views showing a plurality of kinds of shapes each configuring an extension member of the antenna device according to the twenty-first preferred embodiment of the present invention. The antenna device according to this preferred embodiment differs from the antenna device 10 according to the first preferred embodiment in the shapes of extension members 30FP and 30CN.

As shown in FIG. 27A, the extension member 30FP includes flat-connector lands 323FP and 333FP instead of the external-connection land conductors 323 and 333 in the extension member 30 according to the first preferred embodiment. The flat-connector lands 323FP and 333FP are configured by plating (for example, Ti plating and Au plating) for flat connector connections at end portions of the first extension conductor pattern 322 and the second extension conductor pattern 332 located opposite to the first end-portion conductor 321 and the second end-portion conductor 331. The external shape of the second base 31 is small (small area) in accordance with the shape of a conductor pattern to be provided.

As shown in FIG. 27B, the extension member 30CN includes a coaxial connector 3233CN instead of the external-connection land conductors 323 and 333 in the extension member according to the first preferred embodiment. The inner conductor and outer conductor of the coaxial connector 3233CN are respectively connected to end portions of the first extension conductor pattern 322 and the second extension conductor pattern 332 located opposite to the first end-portion conductor 321 and the second end-portion conductor 331. The external shape of the second base 31 is small (small area) in accordance with the shape of a conductor pattern to be provided.

As described above, a portion that connects the antenna device with an external circuit can have various configurations.

Figure 28A:
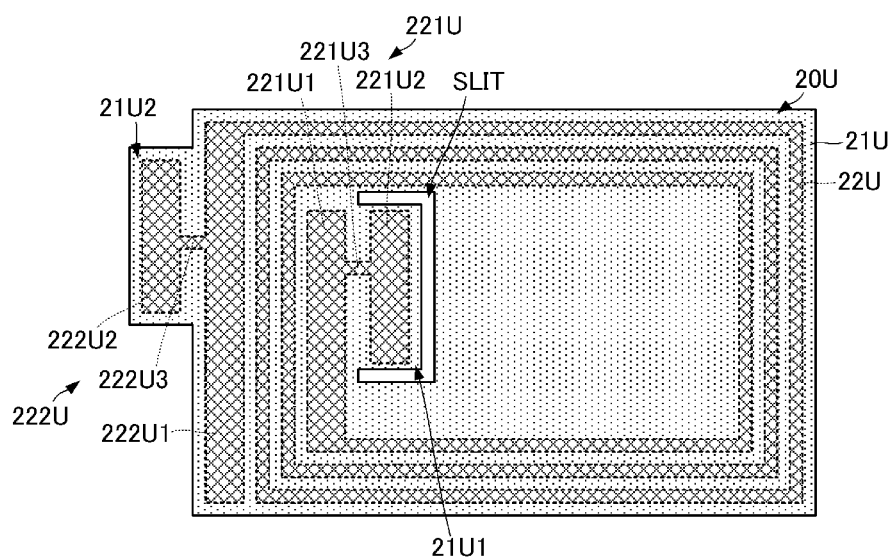
FIGS. 28A-28C are a plan view of an antenna coil member of an antenna device according to a twenty-second preferred embodiment of the present invention, and a plan view and a side cross-sectional view of the antenna device.
Figure 28B:
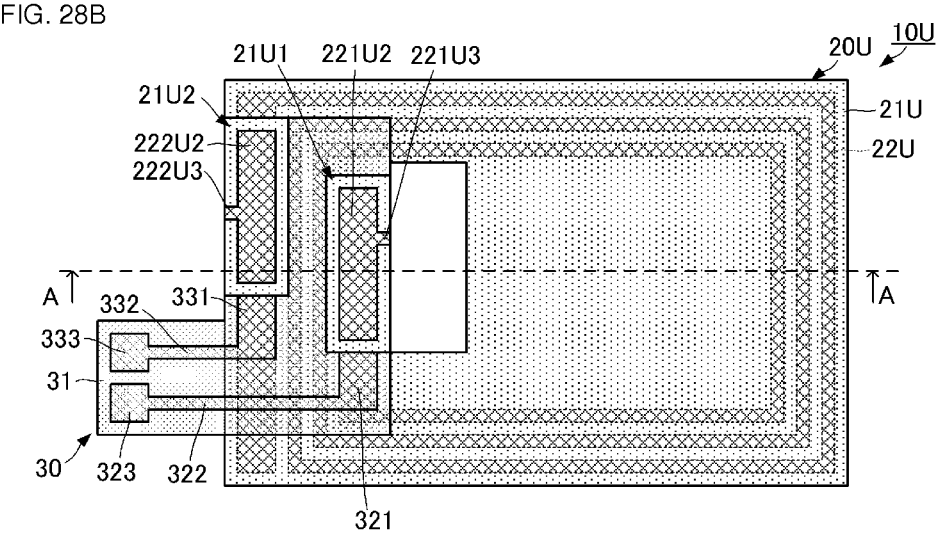
Figure 28C:
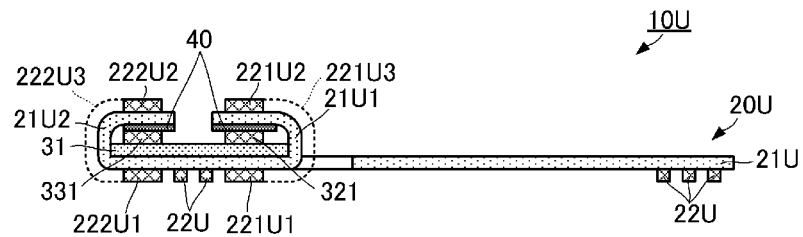

Next, an antenna device according to a twenty-second preferred embodiment of the present invention is described with reference to the drawings. FIGS. 28A-28C are a plan view of an antenna coil member of the antenna device according to the twenty-second preferred embodiment of the present invention, and a plan view and a side cross-sectional view of the antenna device. An antenna device 10U according to this preferred embodiment differs from the antenna device 10 according to the first preferred embodiment in the configuration of the antenna coil member 20 and the configuration that the extension member 30 and an antenna coil member 20U have capacitive coupling.

The antenna coil member 20U includes a first base 21U, a spiral conductor 22U, an inner-peripheral-end conductor 221U, and an outer-peripheral-end conductor 222U.

The spiral conductor 22U preferably has the same shape as the shape or substantially the same shape of the spiral conductor 22 of the antenna coil member 20 according to the first preferred embodiment.

The inner-peripheral-end conductor 221U includes a first capacitive coupling portion 221U1, a second capacitive coupling portion 221U2, and a connecting portion 221U3. The first capacitive coupling portion 221U1 preferably has the same shape or substantially the same shape as the shape of the inner-peripheral-end conductor 221 of the antenna coil member 20 according to the first preferred embodiment. The shape in a plan view of the second capacitive coupling portion 221U2 is preferably the same or substantially the same as the shape of the first capacitive coupling portion 221U1. The second capacitive coupling portion 221U2 is provided inside a ring shape surrounded by the spiral conductor 22U. The extending directions of the first capacitive coupling portion 221U1 and the second capacitive coupling portion 221U2 are parallel or substantially parallel to each other. The connecting portion 221U3 connects the first capacitive coupling portion 221U1 with the second capacitive coupling portion 221U2.

The outer-peripheral-end conductor 222U includes a first capacitive coupling portion 222U1, a second capacitive coupling portion 222U2, and a connecting portion 222U3. The first capacitive coupling portion 222U1 preferably has the same shape or substantially the same shape as the shape of the outer-peripheral-end conductor 222 of the antenna coil member 20 according to the first preferred embodiment. The shape in a plan view of the second capacitive coupling portion 222U2 is preferably the same or substantially the same as the shape of the first capacitive coupling portion 222U1. The second capacitive coupling portion 222U2 is arranged inside a ring shape surrounded by the spiral conductor 22U. The extending directions of the first capacitive coupling portion 222U1 and the second capacitive coupling portion 222U2 are parallel or substantially parallel to each other. The connecting portion 222U3 connects the first capacitive coupling portion 222U1 with the second capacitive coupling portion 222U2.

A slit SLIT is provided in the region of the first base 21U inside the ring shape surrounded by the spiral conductor 22U. The slit SLIT is a strip-shaped cut and removed portion of the base. The slit SLIT surrounds the second capacitive coupling portion 221U2 of the inner-peripheral-end conductor 221U. The slit SLIT is not provided at a side where the first capacitive coupling portion 221U1 faces the second capacitive coupling portion 221U2. Alternatively, the slit SLIT may be provided while only a portion where the connecting portion 222U3 is located remains.

The second capacitive coupling portion 221U2 of the inner-peripheral-end conductor 221U is provided at a first foldable portion 21U1 surrounded by the slit SLIT and the formation region of the first capacitive coupling portion 221U1.

The first base 21U includes a second foldable portion 21U2. The second foldable portion 21U2 has a shape projecting outward from a side of the first base 21 according to the first preferred embodiment including the outer-peripheral-end conductor 222U. The second capacitive coupling portion 222U2 of the outer-peripheral-end conductor 222U is provided at the second foldable portion 21U2.

The antenna coil member 20U and the extension member are arranged so that a surface of the first base 21U not including the spiral conductor 22U contacts a surface of the second base 31 not including the conductor pattern.

A region of the extension member 30 including the first end-portion conductor 321 is sandwiched between a major portion of the first base 21U of the antenna coil member 20U and the first foldable portion 21U. Accordingly, a structure in which the first end-portion conductor 321 of the extension member 30 is sandwiched between the first capacitive coupling portion 221U1 and the second capacitive coupling portion 221U2 of the inner-peripheral-end conductor 221U of the antenna coil member 20U is realized.

A region of the extension member 30 including the second end-portion conductor 331 is sandwiched between a major portion of the first base 21U and the second foldable portion 21U2 of the antenna coil member 20U. Accordingly, a structure in which the first end-portion conductor 321 of the extension member 30 is sandwiched between the first capacitive coupling portion 221U1 and the second capacitive coupling portion 221U2 of the inner-peripheral-end conductor 221U of the antenna coil member 20U is realized.

With such a configuration, the capacitance by the inner-peripheral-end conductor 221U and the first end-portion conductor 321 is increased. Similarly, the capacitance by the outer-peripheral-end conductor 222U and the second end-portion conductor 331 is increased.

In this preferred embodiment, the first and second foldable portions 21U1 and 21U2 and the extension member 30 are bonded by the adhesive layer 40; however, the extension member and the major portion of the first base 21U may be additionally bonded by the adhesive layer 40.

Also, a hole formed in the first base 21U by bending in this preferred embodiment may be used as the penetrating groove 210 through which the magnetic substance sheet 61M passes in the antenna device 10M according to the above-described fourteenth preferred embodiment.

Figure 29A:
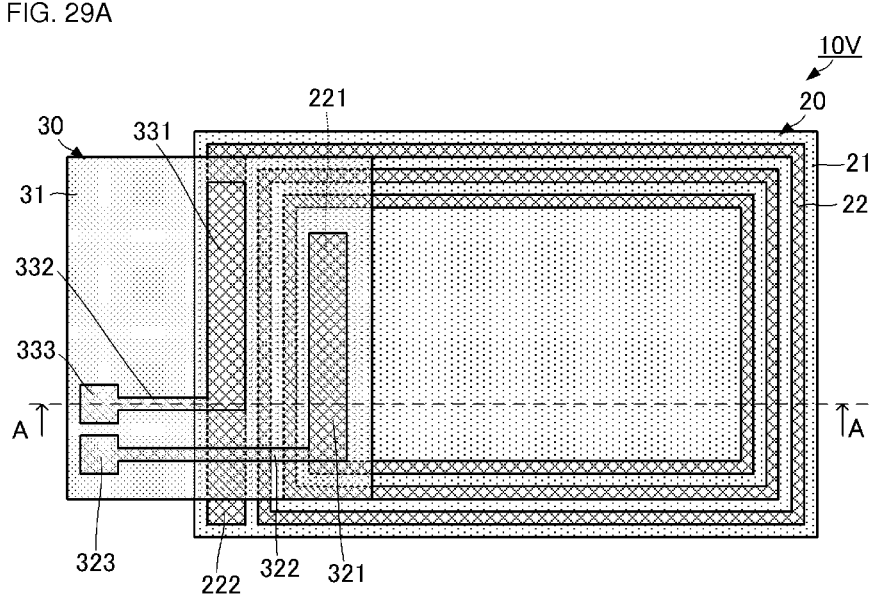
FIGS. 29A and 29B are a plan view and a side cross-sectional view of an antenna device according to a twenty-third preferred embodiment of the present invention.
Figure 29B:
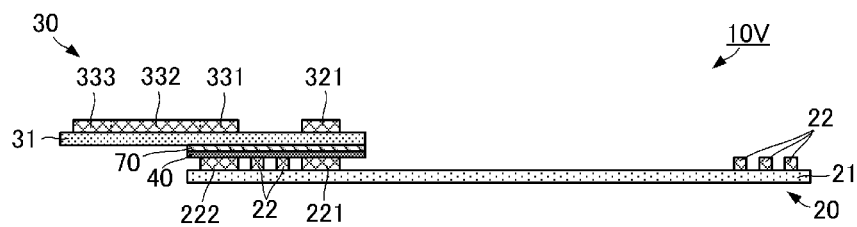

Next, an antenna device according to a twenty-third preferred embodiment of the present invention is described with reference to the drawings. FIGS. 29A and 29B are a plan view and a side cross-sectional view of the antenna device according to the twenty-third preferred embodiment of the present invention. An antenna device 10V according to this preferred embodiment differs from the antenna device 10 according to the first preferred embodiment in that an impedance-adjustment conductor pattern 70 preferably is added.

The impedance-adjustment conductor pattern 70 is arranged between the antenna coil member 20 and the extension member 30 to sandwich the adhesive layer 40 with respect to the spiral conductor 22, the inner-peripheral-end conductor 221, and the outer-peripheral-end conductor 222.

With such a configuration, the impedance for an antenna matching circuit is adjusted, and a matching circuit with a desirable impedance is easily realized.

Also, since the impedance-adjustment conductor pattern 70 changes the magnetic flux generated by the spiral conductor 22, the degree of freedom for radiation characteristics of the antenna device 10V is improved.

Figure 30A:
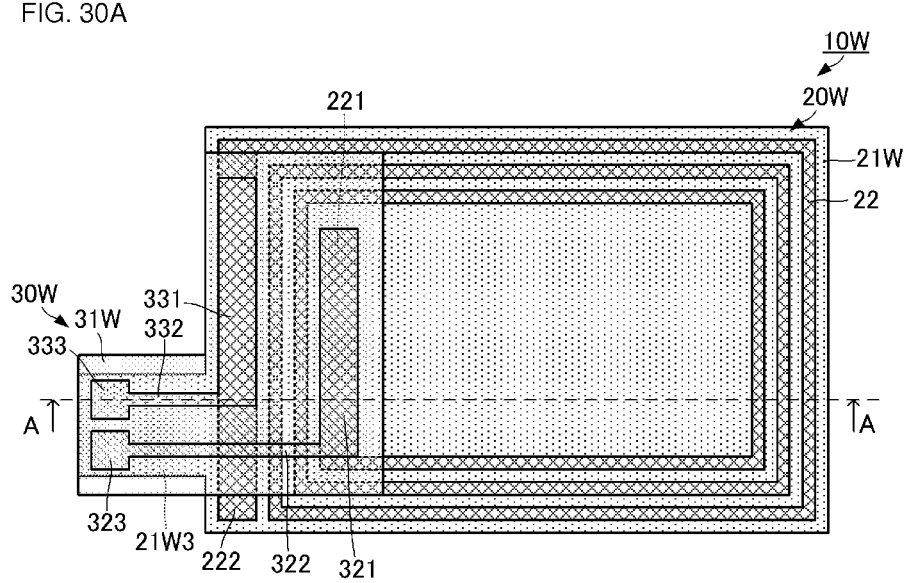
FIGS. 30A and 30B are a plan view and a side cross-sectional view of an antenna device according to a twenty-fourth preferred embodiment of the present invention.
Figure 30B:
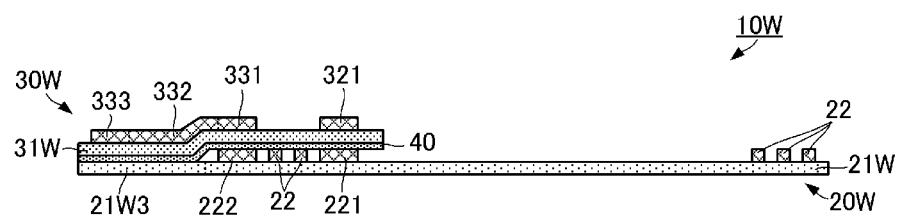

Next, an antenna device according to a twenty-fourth preferred embodiment of the present invention is described with reference to the drawings. FIGS. 30A and 30B are a plan view and a side cross-sectional view of the antenna device according to the twenty-fourth preferred embodiment of the present invention. An antenna device 10W according to this preferred embodiment differs from the antenna device 10 according to the first preferred embodiment in the shape of an antenna coil member 20W.

A first base 21W of the antenna coil member 20W includes a major portion having the same shape as the first base according to the first preferred embodiment, and a reinforcing expansion portion 21W3. The major portion and the reinforcing expansion portion 21W3 of the first base 21W are connected to each other and preferably are integrally formed in this preferred embodiment. The reinforcing expansion portion 21W3 preferably includes a region of the extension member 30 where the external-connection land conductors 323 and 333 are provided in a plan view of the antenna device 10W.

With such a configuration, the expansion portion 21W3 of the antenna coil member 20W defines and functions as a reinforcing member for the external-connection land conductors 323 and 333. Accordingly, when the external-connection land conductors 323 and 333 are physically connected to an external device (for example, if the probe contacts as described above), the intensities of the external-connection land conductors 323 and 333 are increased. Accordingly, connection reliability of the external-connection land conductors 323 and 333 with respect to the external device is improved.

The antenna coil member 20W including the expansion portion 21W3 is preferably bonded to the extension member 30 through the adhesive layer 40.

Also, in this preferred embodiment, the expansion portion 21W3 preferably includes at least a region where the external-connection land conductors 323 and 333 and the first and second extension conductor patterns 322 and 332 are provided. However, in a plan view of the antenna device 10W, the expansion portion may be provided entirely in a region where the extension member 30 does not overlap the major portion of the first base 21W.

Figure 31A:
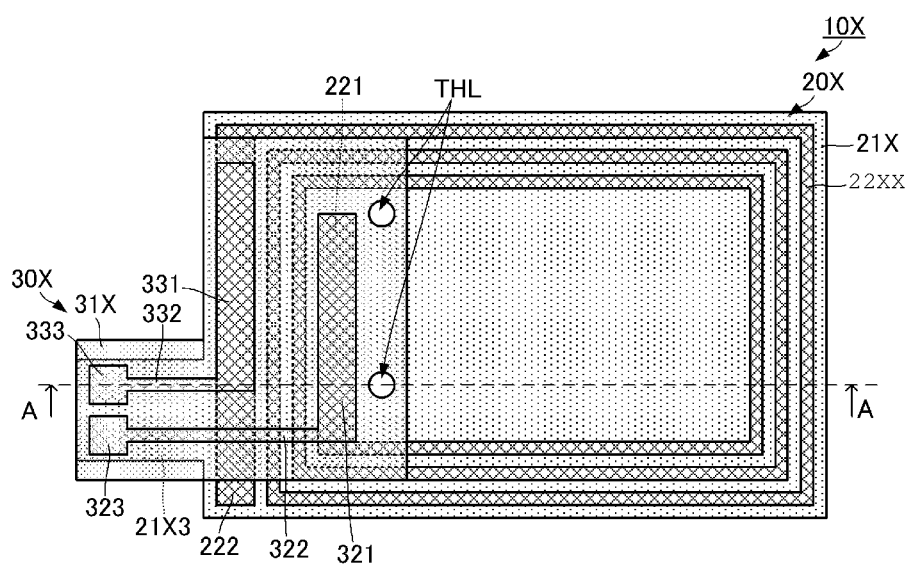
FIGS. 31A and 31B are a plan view and a side cross-sectional view of an antenna device according to a twenty-fifth preferred embodiment of the present invention.
Figure 31B:
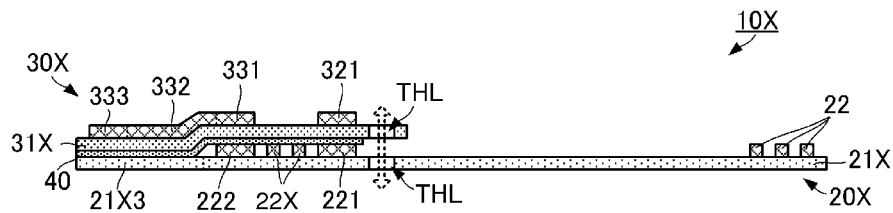

Next, an antenna device according to a twenty-fifth preferred embodiment of the present invention is described with reference to the drawings. FIGS. 31A and 31B are a plan view and a side cross-sectional view of the antenna device according to the twenty-fifth preferred embodiment of the present invention. An antenna device 10X according to this preferred embodiment differs from the antenna device 10W according to the twenty-fourth preferred embodiment in that a positioning through hole THL is added.

The positioning through hole THL is provided in both a first base 21X of an antenna coil member 20X and a second base 22X of an extension member 30X. In a state in which the antenna coil member 20X and the extension member 30X are arranged to define the antenna device 10X, the positioning through hole THL of the first base 21X and the positioning through hole THL of the second base 22X are arranged to overlap each other.

With such a configuration, the antenna coil member 20X and the extension member 30X are easily arranged with a proper positional relationship.

In this preferred embodiment, a plurality of positioning through holes THL are provided in each of the first base 21X and the second base 22X; however, a single positioning through hole THL may be provided. Also, in this preferred embodiment, the positioning through hole THL is provided in a region inside a ring shape of the spiral conductor 22; however, the positioning through hole THL may be provided in a region outside the ring shape. Alternatively, positioning through holes THL may be provided inside and outside the ring shape.

Figure 32A:
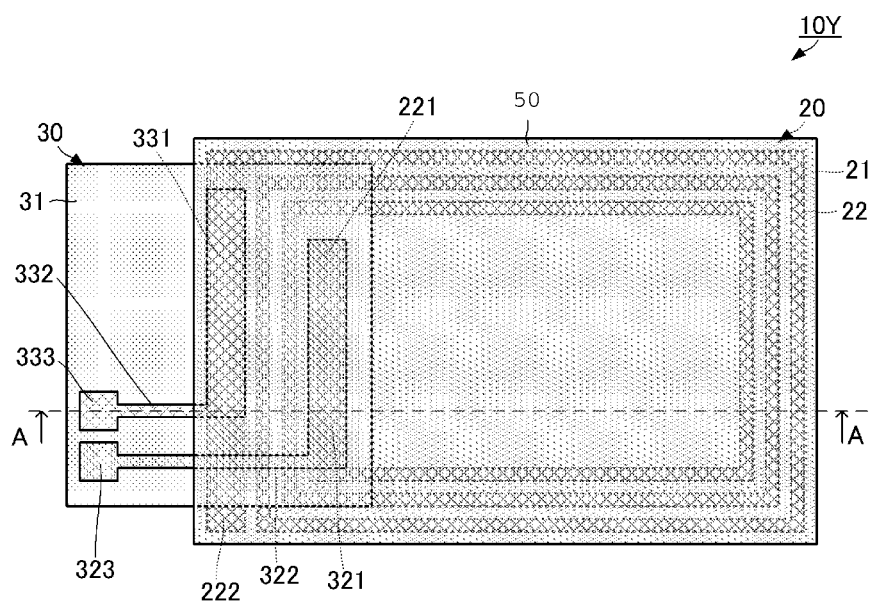
FIGS. 32A and 32B are a plan view and a side cross-sectional view of an antenna device according to a twenty-sixth preferred embodiment of the present invention.
Figure 32B:
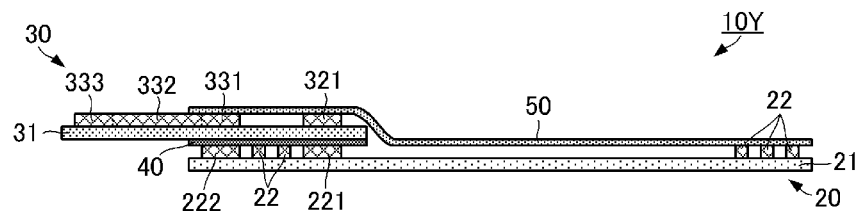

Next, an antenna device according to a twenty-sixth preferred embodiment of the present invention is described with reference to the drawings. FIGS. 32A and 32B are a plan view and a side cross-sectional view of the antenna device according to the twenty-sixth preferred embodiment of the present invention. An antenna device 10Y according to this preferred embodiment differs from the antenna device 10 according to the first preferred embodiment in that a protection layer 50 preferably is added.

The protection layer 50 has insulating properties, and preferably covers the entire or substantially the entire front surface of the antenna coil member 20 where the extension member is arranged. At this time, the protection layer 50 is arranged to cover all the conductors exposed from the front surface of the antenna coil member 20 and at least the first and second end-portion conductors 321 and 331 of the extension member 30.

With such a configuration, the entire or substantially entire region of the conductors configuring the antenna device 10Y except the external-connection land conductors 323 and 333 preferably is covered with the protection layer 50. Accordingly, similarly to the antenna devices according to the above-described second to fifth preferred embodiments, an antenna device with high reliability is realized.

In the antenna device 10Y according to this preferred embodiment, the entire surface except the front surfaces of the external-connection land conductors 323 and 333 is preferably covered with the protection layer. Further, plating for anti-corrosion is preferably applied to the external-connection land conductors 323 and 333. By using such a configuration, an antenna device with higher reliability is realized.

Figure 33A:
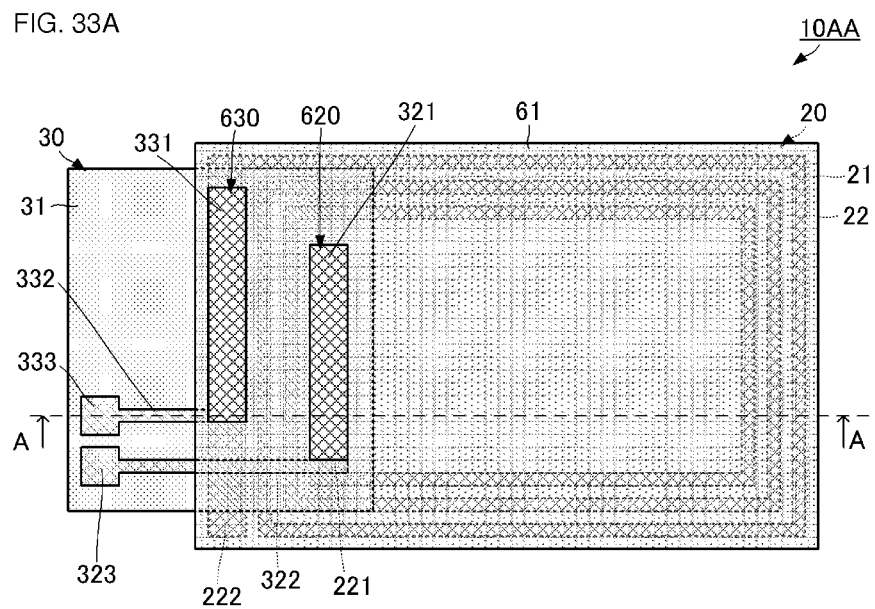
FIGS. 33A and 33B are a plan view and a side cross-sectional view of an antenna device according to a twenty-seventh preferred embodiment of the present invention.
Figure 33B:
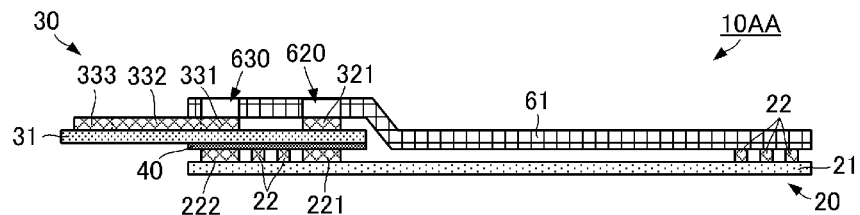

Next, an antenna device according to a twenty-seventh preferred embodiment of the present invention is described with reference to the drawings. FIGS. 33A and 33B are a plan view and a side cross-sectional view of the antenna device according to the twenty-seventh preferred embodiment of the present invention. An antenna device 10AA according to this preferred embodiment is configured such that through holes 620 and 630 are provided in a magnetic substance sheet 61 of the antenna device 10E according to the sixth preferred embodiment.

The through hole 620 is provided in the magnetic substance sheet 61 so as to overlap the first end-portion conductor 321 in a plan view of the antenna device 10AA. The through hole 630 is provided in the magnetic substance sheet 61 so as to overlap the second end-portion conductor 331 in a plan view of the antenna device 10AA. The area that the through hole 620 overlaps the first end-portion conductor 321 is preferably the same as the area that the through hole 630 overlaps the second end-portion conductor 331.

A magnetic substance sheet such as ferrite typically has a higher dielectric constant than that of the air. With such a configuration, if a conductor is arranged at the magnetic substance sheet 61 side of the antenna device 10AA, capacitive coupling of the first end-portion conductor 321 and the second end-portion conductor 331 with respect to the conductor is significantly reduced or prevented. In particular, the first end-portion conductor 321 and the second end-portion conductor 331 have a larger area than the area of other conductor pattern such as the spiral conductor 22. Hence, the first end-portion conductor 321 and the second end-portion conductor 331 likely has capacitive coupling with an external conductor. However, by using this configuration, the capacitive coupling is significantly reduced or prevented. Accordingly, a change in characteristics of the antenna device 10AA depending on the arrangement environment is further effectively significantly reduced or prevented.

The area that the through hole 620 overlaps the first end-portion conductor 321 and the area that the through hole 630 overlaps the second end-portion conductor 331 may be properly set in accordance with the specification of the antenna device 10AA.

Figure 34A:
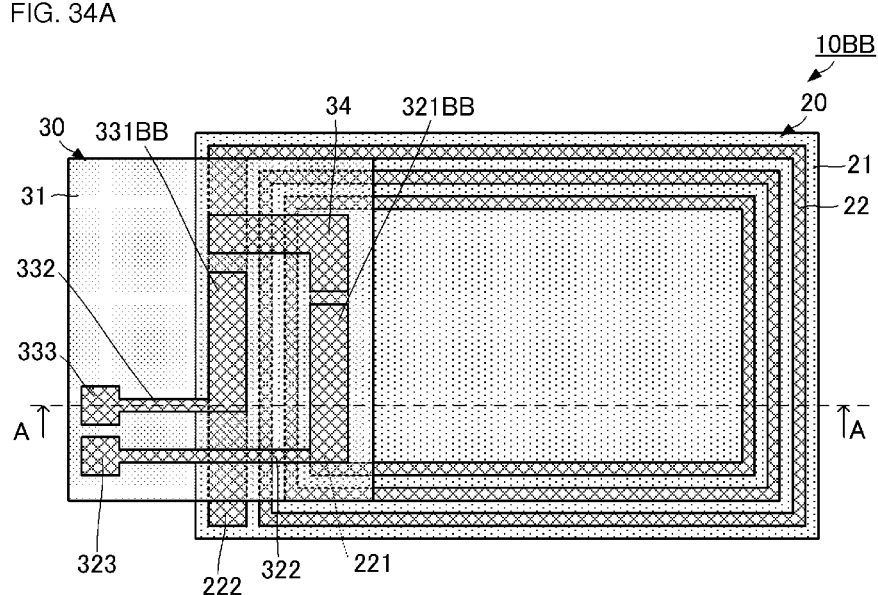
FIGS. 34A and 34B are a plan view and a side cross-sectional view of an antenna device according to a twenty-eighth preferred embodiment of the present invention.
Figure 34B:
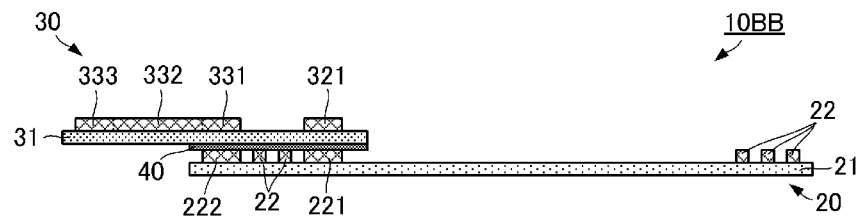

Next, an antenna device according to a twenty-eighth preferred embodiment of the present invention is described with reference to the drawings. FIGS. 34A and 34B are a plan view and a side cross-sectional view of the antenna device according to the twenty-eighth preferred embodiment of the present invention. An antenna device 10BB according to this preferred embodiment differs from the antenna device 10 according to the first preferred embodiment in that an auxiliary conductor 34 that adjusts the frequency of the antenna is added.

The auxiliary conductor 34 is provided on the same plane of the second base 31 as the plane of a first end-portion conductor 321BB and a second end-portion conductor 331BB. The auxiliary conductor 34 overlaps the inner-peripheral-end conductor 221 and the outer-peripheral-end conductor 222 in a plan view. A portion of the auxiliary conductor 34 overlapping the inner-peripheral-end conductor 221 and a portion of the auxiliary conductor 34 overlapping the outer-peripheral-end conductor 222 communicate with each other and are integrated.

Since the auxiliary conductor 34 is provided, the first end-portion conductor 321BB is defined by a shorter length than the length of the first end-portion conductor 321 according to the first preferred embodiment. The second end-portion conductor 331BB is defined by a shorter length than the length of the second end-portion conductor 331 according to the first preferred embodiment.

With such a configuration, the capacitor provided because the auxiliary conductor 34 overlaps the inner-peripheral-end conductor 221 and the outer-peripheral-end conductor 222 is parallel-connected to the inductor defined by the spiral conductor 22. As described above, by parallel-connecting the capacitor to the inductor defining the antenna, the impedance characteristics of the antenna is adjusted and the frequency of a high-frequency signal transmitted and received by the antenna is adjusted.

Figure 35A:
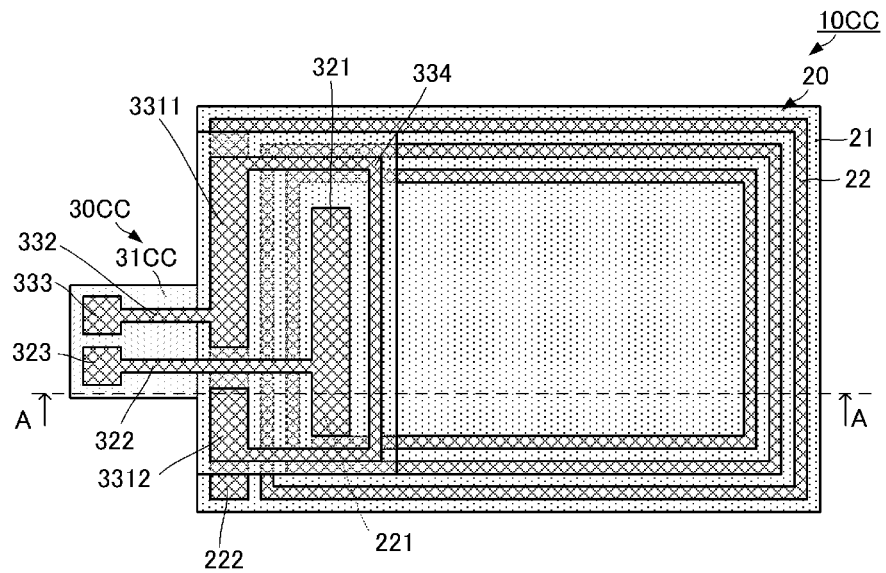
FIGS. 35A and 35B are a plan view and a side cross-sectional view of an antenna device according to a twenty-ninth preferred embodiment of the present invention.
Figure 35B:
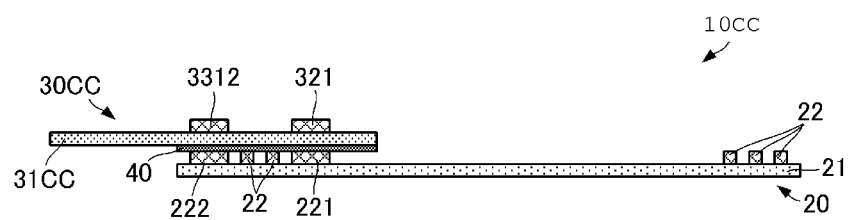

Next, an antenna device according to a twenty-ninth preferred embodiment of the present invention is described with reference to the drawings. FIGS. 35A and 35B are a plan view and a side cross-sectional view of the antenna device according to the twenty-ninth preferred embodiment of the present invention. An antenna device 10CC according to this preferred embodiment differs from the antenna device 10 according to the first preferred embodiment in the configuration of an extension member 30CC.

The extension member 30CC includes a second base 31CC, the first end-portion conductor 321, second end-portion conductors 3311 and 3312, the first extension conductor pattern 322, the second extension conductor pattern 332, and the external-connection land conductors 323 and 333.

The external-connection land conductors 323 and 333 are arranged at intermediate or substantially intermediate positions in the extending directions of the inner-peripheral-end conductors 221 and 222 in the antenna coil member 20.

The first end-portion conductor 321 is arranged to overlap the inner-peripheral-end conductor 221. The first extension conductor pattern 322 connects the inner-peripheral-end conductor 221 with the external-connection land conductor 323. The first extension conductor pattern 322 has a shape extending in a direction perpendicular or substantially perpendicular to the extending direction of the first end-portion conductor 321.

The second end-portion conductors 3311 and 3312 are arranged to overlap the outer-peripheral-end conductor 222. The second end-portion conductors 3311 and 3312 are connected by a connection routing conductor 334. The connection routing conductor 334 preferably has a ring shape arranged around the periphery of the first end-portion conductor 321. Wiring of the connection routing conductor 334 preferably does not overlap the spiral conductor 22 as possible to avoid unnecessary electromagnetic coupling.

The second extension conductor pattern 322R connects the second end-portion conductor 3311 with the external-connection land conductor 333. The second extension conductor pattern 332 has a shape extending in a direction perpendicular or substantially perpendicular to the extending direction of the second end-portion conductor 3311.

As described above, since the conductor overlapping the outer-peripheral-end conductor 222 is divided into the second end-portion conductors 3311 and 3312, and the connection routing conductor 334 is provided, the first and second extension conductor patterns 322 and 332 are preferably defined by a length as short as possible in accordance with the positions of the external-connection land conductors 323 and 333. Unnecessary inductance or resistance of the first and second extension conductor patterns 322 and 332 are significantly reduced or prevented.

Also, by using this configuration, an extension conductor pattern is not required to be provided at the external-connection land conductor side of the second end-portion conductor. Hence, the extension member 30CC does not require a region where the extension conductor pattern is provided at the external-connection land conductor side of the second end-portion conductor. Hence, the region where the extension member 30CC does not overlap the antenna coil member 20 is decreased. Accordingly, even if the arrangement position of the antenna device 10CC and the positions of the external-connection land conductors 323 and 333 are previously determined, the antenna device 10CC are able to be provided and configured without deterioration in antenna characteristics.

Figure 36:
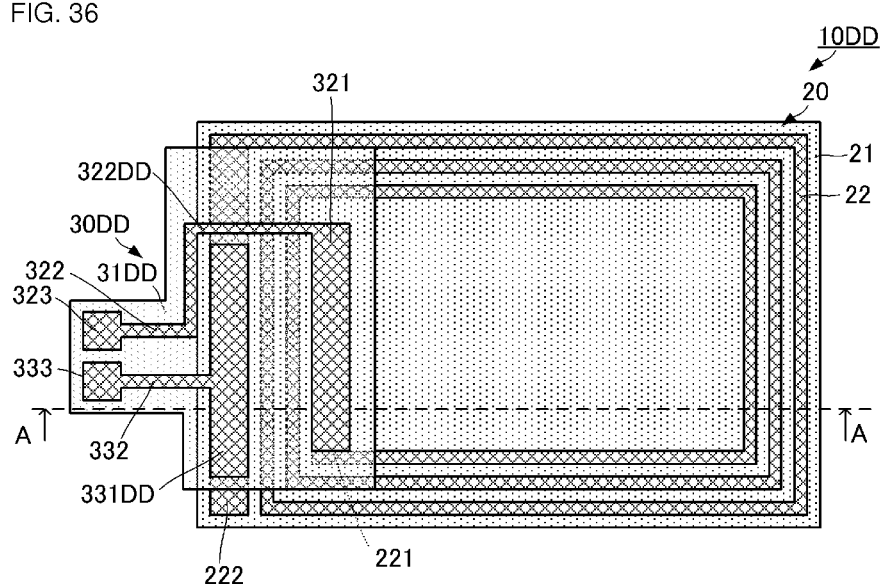
FIG. 36 is a plan view of an antenna device according to the thirtieth preferred embodiment of the present invention.

Next, an antenna device according to a thirtieth preferred embodiment of the present invention is described with reference to the drawings. FIG. 36 is a plan view of the antenna device according to the thirtieth preferred embodiment of the present invention. An antenna device 10DD according to this preferred embodiment differs from the antenna device 10CC according to the twenty-ninth preferred embodiment in the configuration of an extension member 30DD.

A second end-portion conductor 331DD is not divided, and a connection routing conductor is not provided. Also, wiring of a first extension conductor pattern 322DD is arranged to bypass the second end-portion conductor 331.

With such a configuration, the antenna device 10DD with a shape corresponding to the positions of the external-connection land conductors 323 and 333 is realized.

Figure 37A:
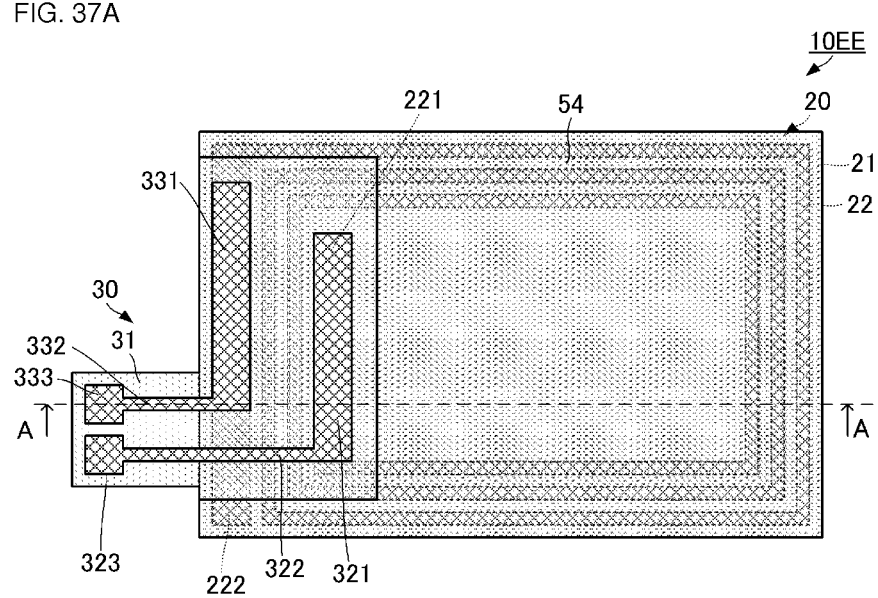
FIGS. 37A and 37B are a plan view and a side cross-sectional view of an antenna device according to a thirty-first preferred embodiment of the present invention.
Figure 37B:
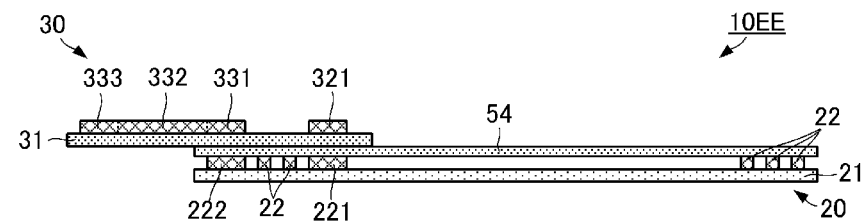

Next, an antenna device according to a thirty-first preferred embodiment of the present invention is described with reference to the drawings. FIGS. 37A and 37B are a plan view and a side cross-sectional view of the antenna device according to the thirty-first preferred embodiment of the present invention. An antenna device 10EE according to this preferred embodiment differs from the antenna device 10B according to the third preferred embodiment in a protection layer 54.

The protection layer 54 is adhesive and bonds the antenna coil member 20 with the extension member 30. Hence, the adhesive layer 40 provided at the antenna device 10B according to the third preferred embodiment can be omitted. For example, the protection layer 54 preferably includes a resist film with thermosetting properties or UV curable properties.

Such a configuration is able to be realized by the following step.

A resist film is attached to the antenna coil member and the extension member 30 is arranged. Then, the resist film is hardened by applying heat or UV to the resist film. Accordingly, the antenna coil member 20 and the extension member are bonded by the hardened resist film, that is, the protection layer 54. Alternatively, liquid resist having a predetermined viscosity may be used instead of the resist film.

With such a configuration, the number of components of the antenna device 10EE is decreased. Also, the antenna device 10EE is able to be formed in an even thinner shape. Also, the distance between the inner-peripheral-end conductor 221 and the first end-portion conductor 321, and the distance between the outer-peripheral-end conductor 222 and the second end-portion conductor 331 are able to be decreased, and capacitive coupling between these components is increased.

Figure 38A:
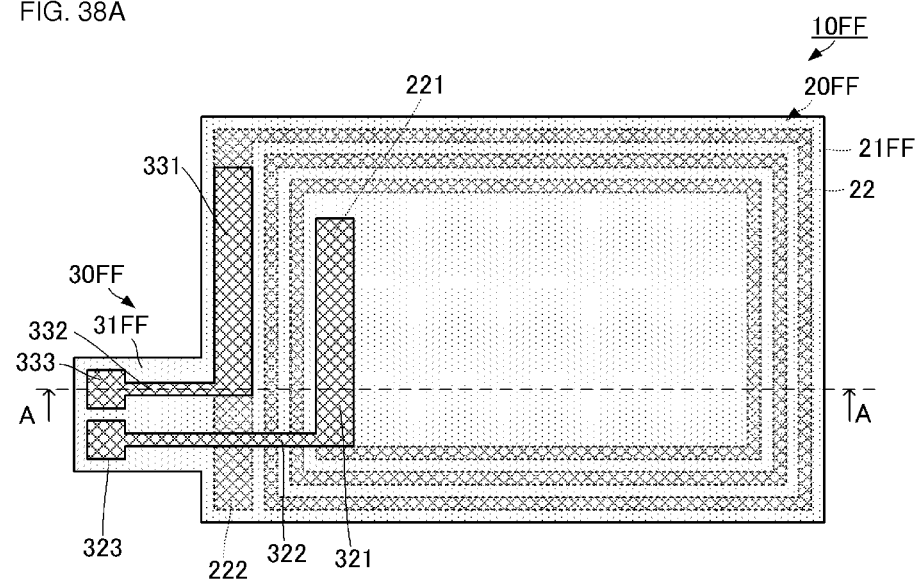
FIGS. 38A and 38B are a plan view and a side cross-sectional view of an antenna device according to a thirty-second preferred embodiment of the present invention.
Figure 38B:
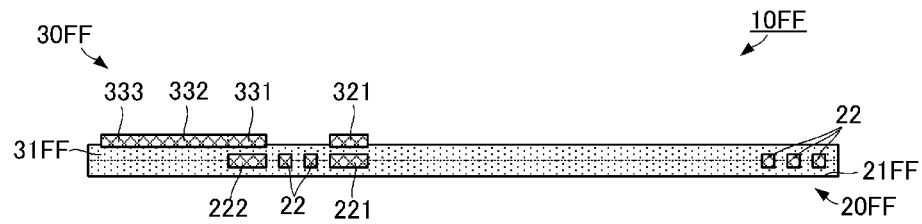

Next, an antenna device according to a thirty-second preferred embodiment of the present invention is described with reference to the drawings. FIGS. 38A and 38B are a plan view and a side cross-sectional view of the antenna device according to the thirty-second preferred embodiment of the present invention. An antenna device 10FF according to this preferred embodiment differs from the antenna device 10 according to the first preferred embodiment in the shapes and materials of a first base 21FF and a second base 31FF.

The first base 21FF of an antenna coil member 20FF preferably has the same or substantially the same shape as the shape of the second base 31FF of an extension member 30FF. To be specific, the shapes in a plan view of the first base 21FF and the second base 31FF preferably are the same or substantially the same as the shape in a plan view of the antenna device 10FF. The materials of the first base 21FF and the second base 31FF preferably are thermoplastic resin. The thermoplastic resin may be polyimide, liquid crystal polymer, or the like.

The first base 21FF and the second base 31FF are press-bonded with heat while the entire surfaces of the bases are overlapped each other. Thus, the antenna device 10FF is realized.

With such a configuration, the distance between the inner-peripheral-end conductor 221 and the first end-portion conductor 321, and the distance between the outer-peripheral-end conductor 222 and the second end-portion conductor 331 is decreased, and capacitive coupling between these components is increased.

Figure 39A:
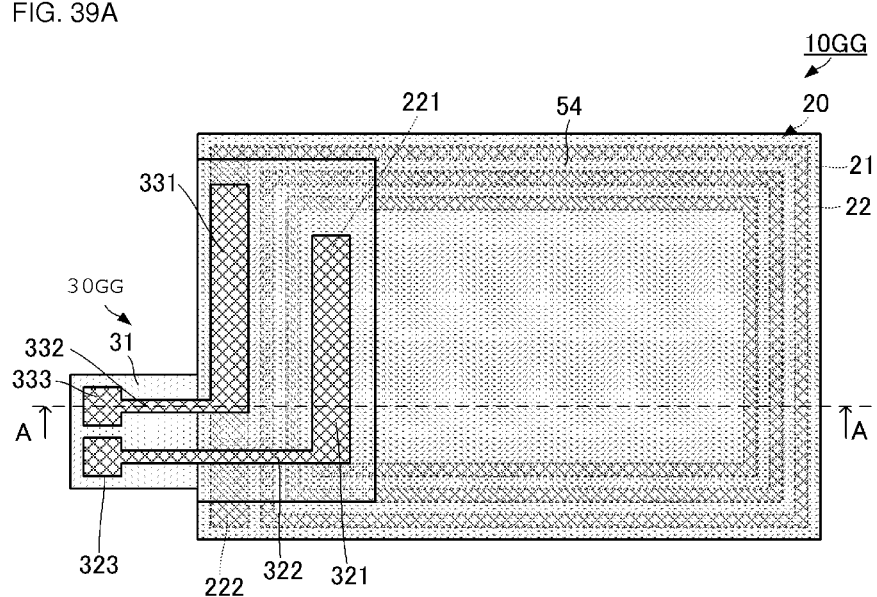
FIGS. 39A and 39B are a plan view and a side cross-sectional view of an antenna device according to a thirty-third preferred embodiment of the present invention.
Figure 39B:
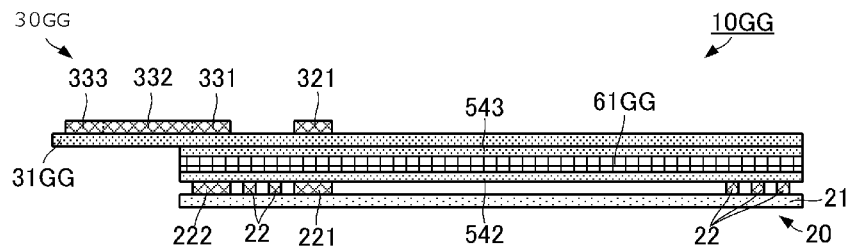

Next, an antenna device according to a thirty-third preferred embodiment of the present invention is described with reference to the drawings. FIGS. 39A and 39B are a plan view and a side cross-sectional view of the antenna device according to the thirty-third preferred embodiment of the present invention. An antenna device 10GG according to this preferred embodiment differs from the antenna device 10EE according to the thirty-first preferred embodiment in that a magnetic substance sheet 61GG preferably is added.

The magnetic substance sheet 61GG has a shape covering the entire first base 21 (the antenna coil member 20). The magnetic substance sheet 61GG is bonded to the first base 21 through an adhesive protection layer 542.

A second base 31GG of an extension member 30GG has a shape covering the entire first base 21. The second base 31GG is bonded to the magnetic substance sheet 61GG through an adhesive protection layer 543.

With such a configuration, the magnetic substance sheet 61GG is arranged over the entire surface in a plan view of the spiral conductor 22. Accordingly, characteristics of the antenna are improved.

With this configuration, the distance between the inner-peripheral-end conductor 221 and the first end-portion conductor 321 and the distance between the outer-peripheral-end conductor 222 and the second end-portion conductor 331 are separated only by the thicknesses of the magnetic substance sheet 61GG and the protection layers 542 and 543. However, since the magnetic substance sheet 61GG has a predetermined dielectric constant, capacitive coupling between the inner-peripheral-end conductor 221 and the first end-portion conductor 321 and capacitive coupling between the outer-peripheral-end conductor 222 and the second end-portion conductor 331 are obtained equivalently to the antenna device 10 according to the first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device, comprising:
an antenna coil member including an insulating first base, an antenna coil including a spiral-shaped conductor pattern on a front surface of the first base, an inner-peripheral-end conductor on the front surface of the first base and connected to an inner peripheral end of the spiral-shaped conductor pattern, and an outer-peripheral-end conductor on the front surface of the first base and connected to an outer peripheral end of the spiral-shaped conductor pattern; and
an extension member including an insulating second base, first and second extension conductor patterns on a front surface of the second base, a first end-portion conductor on the front surface of the second base and connected to one end of the first extension conductor pattern, and a second end-portion conductor on the front surface of the second base and connected to one end of the second extension conductor pattern; wherein
the antenna coil member and the extension member are arranged so that the inner-peripheral-end conductor faces the first end-portion conductor, the outer-peripheral-end conductor faces the second end-portion conductor, the other end of the first extension conductor pattern or the other end of the second extension conductor pattern does not overlap the spiral-shaped conductor pattern, and the other ends of the first and second extension conductor patterns are arranged inside or outside the spiral-shaped conductor pattern.

2. The antenna device according to claim 1, wherein a width of the inner-peripheral-end conductor and a width of the outer-peripheral-end conductor are larger than a width of the spiral-shaped conductor pattern.

3. The antenna device according to claim 1, wherein a facing area between the inner-peripheral-end conductor and the first end-portion conductor is equal or substantially equal to a facing area between the outer-peripheral-end conductor and the second end-portion conductor.

4. The antenna device according to claim 1, wherein
an area of the inner-peripheral-end conductor differs from an area of the first end-portion conductor in a plan view; and
an area of the outer-peripheral-end conductor differs from an area of the second end-portion conductor in a plan view.

5. The antenna device according to claim 4, wherein
the first end-portion conductor, the second end-portion conductor, the inner-peripheral-end conductor, and the outer-peripheral-end conductor are rectangular or substantially rectangular in a plan view; and
long sides of the first end-portion conductor, the second end-portion conductor, the inner-peripheral-end conductor, and the outer-peripheral-end conductor are parallel or substantially parallel to each other.

6. The antenna device according to claim 1, further comprising a protection layer that covers at least one of principal surfaces of the first end-portion conductor and the second end-portion conductor located opposite to the second base, and principal surfaces of the inner-peripheral-end conductor and the outer-peripheral-end conductor located opposite to the first base.

7. The antenna device according to claim 1, wherein a planar area of the second base is smaller than a planar area of the first base in a plan view.

8. The antenna device according to claim 1, wherein the antenna coil member is not plated and the extension member is plated.

9. The antenna device according to claim 1, wherein the first base and the second base are made of different materials.

10. A wireless communication terminal, comprising:
the antenna device according to claim 1;
a transmission/reception IC connected to the antenna coil; and
a matching circuit connected between the antenna coil and the transmission/reception IC; wherein
a capacitor provided due to the inner-peripheral-end conductor facing the first end-portion conductor and a capacitor provided due to the outer-peripheral-end conductor facing the second end-portion conductor define at least a portion of the matching circuit.

11. The wireless communication terminal according to claim 10, wherein the first base is a housing of the terminal.

12. A wireless communication terminal, comprising:
the antenna device according to claim 1;
a transmission/reception IC connected to the antenna coil; and
a matching circuit connected between the antenna coil and the transmission/reception IC; wherein
the second base is a housing of the terminal.

13. The wireless communication terminal according to claim 12, wherein a width of the inner-peripheral-end conductor and a width of the outer-peripheral-end conductor are larger than a width of the spiral-shaped conductor pattern.

14. The wireless communication terminal according to claim 12, wherein a facing area between the inner-peripheral-end conductor and the first end-portion conductor is equal or substantially equal to a facing area between the outer-peripheral-end conductor and the second end-portion conductor.

15. The wireless communication terminal according to claim 12, wherein
an area of the inner-peripheral-end conductor differs from an area of the first end-portion conductor in a plan view; and
an area of the outer-peripheral-end conductor differs from an area of the second end-portion conductor in a plan view.

16. The wireless communication terminal according to claim 15, wherein
the first end-portion conductor, the second end-portion conductor, the inner-peripheral-end conductor, and the outer-peripheral-end conductor are rectangular or substantially rectangular in a plan view; and
long sides of the first end-portion conductor, the second end-portion conductor, the inner-peripheral-end conductor, and the outer-peripheral-end conductor are parallel or substantially parallel to each other.

17. The wireless communication terminal according to claim 12, further comprising a protection layer that covers at least one of principal surfaces of the first end-portion conductor and the second end-portion conductor located opposite to the second base, and principal surfaces of the inner-peripheral-end conductor and the outer-peripheral-end conductor located opposite to the first base.

18. The wireless communication terminal according to claim 12, wherein a planar area of the second base is smaller than a planar area of the first base in a plan view.

19. The wireless communication terminal according to claim 12, wherein the antenna coil member is not plated and the extension member is plated.

20. The wireless communication terminal according to claim 12, wherein the first base and the second base are made of different materials.

\* \* \* \* \*